(12) United States Patent
Cohen et al.

(10) Patent No.: US 10,508,770 B2
(45) Date of Patent: Dec. 17, 2019

(54) COMPRESSED GAS DISPENSING

(71) Applicant: Air Products and Chemicals, Inc., Allentown, PA (US)

(72) Inventors: Joseph Perry Cohen, Bethlehem, PA (US); David John Farese, Riegelsville, PA (US); Donald Earl Thompson, Coplay, PA (US); Todd Eric Carlson, Breinigsville, PA (US); Erwan Louis Joseph Bruneau, Paris (FR); Franciscus Joannes Marcel Schnitzeler, De Meern (NL); Kelly Daniela Ramos Torres, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 288 days.

(21) Appl. No.: 15/465,723

(22) Filed: Mar. 22, 2017

(65) Prior Publication Data
US 2017/0336028 A1   Nov. 23, 2017

Related U.S. Application Data

(60) Provisional application No. 62/356,086, filed on Jun. 29, 2016.

(30) Foreign Application Priority Data

May 23, 2016   (EP) .................................... 16170898

(51) Int. Cl.
*F17C 5/06*   (2006.01)
*F17C 7/00*   (2006.01)
(Continued)

(52) U.S. Cl.
CPC ............. *F17C 5/06* (2013.01); *F17C 5/007* (2013.01); *F17C 7/00* (2013.01); *F17C 13/04* (2013.01);
(Continued)

(58) Field of Classification Search
CPC .... F17C 5/06; F17C 7/00; F17C 13/04; F17C 2227/043; F17C 2265/065; F17C 5/007
See application file for complete search history.

(56) References Cited

U.S. PATENT DOCUMENTS

| 6,786,245 B1 | 9/2004 | Eichelberger et al. |
| 2004/0118476 A1 | 6/2004 | Borck |

(Continued)

FOREIGN PATENT DOCUMENTS

| CN | 101743429 A | 6/2010 |
| CN | 102829325 A | 12/2012 |

(Continued)

OTHER PUBLICATIONS

Anonymous, "Compressed Gas Dispensing", IP.com No. IPCOM000246290D, May 24, 2016.
(Continued)

*Primary Examiner* — Timothy P. Kelly
(74) *Attorney, Agent, or Firm* — Matthew R. Weaver

(57) ABSTRACT

Compressed gas dispensing methods using cascade dispensing from a first plurality of storage vessels and a second plurality of storage vessels. A compressor is used to provide very high pressure compressed gas for the second plurality of pressure storage vessels. Various methods are described for different sources of the compressed gas. The methods are particularly suitable for dispensing hydrogen into storage vessels in vehicles.

11 Claims, 19 Drawing Sheets

(51) Int. Cl.
   *F17C 13/04* (2006.01)
   *F17C 5/00* (2006.01)
(52) U.S. Cl.
   CPC ............. *F17C 2205/0323* (2013.01); *F17C 2221/012* (2013.01); *F17C 2223/0123* (2013.01); *F17C 2223/035* (2013.01); *F17C 2223/036* (2013.01); *F17C 2225/0123* (2013.01); *F17C 2225/036* (2013.01); *F17C 2227/0157* (2013.01); *F17C 2227/041* (2013.01); *F17C 2227/043* (2013.01); *F17C 2265/065* (2013.01); *F17C 2270/0139* (2013.01); *F17C 2270/0581* (2013.01); *Y02E 60/321* (2013.01)

(56) References Cited

U.S. PATENT DOCUMENTS

| | | |
|---|---|---|
| 2009/0151812 A1 | 6/2009 | Allidieres |
| 2009/0236006 A1 | 9/2009 | Farese et al. |
| 2010/0193070 A1 | 8/2010 | Allidieres |
| 2014/0311622 A1 | 10/2014 | Cohen |
| 2014/0352840 A1 | 12/2014 | Blanchet |
| 2015/0211684 A1* | 7/2015 | Santos ............... F17C 5/06 137/1 |
| 2016/0116113 A1 | 4/2016 | Mrowzinski |
| 2016/0169449 A1 | 6/2016 | Kllidieres |

FOREIGN PATENT DOCUMENTS

| | | |
|---|---|---|
| JP | 1996109999 | 4/1996 |
| JP | 2009510352 | 3/2009 |
| JP | 2010534308 A | 11/2011 |
| JP | 2013002635 | 1/2013 |
| JP | 2015230071 | 12/2015 |

OTHER PUBLICATIONS

"Cascade filling system", Wikipedia.org, Dec. 17, 2015 (Dec. 17, 2015), XP002764884, retrieved from the Internet: URL: https://en.wikipedia.org/w/index.php?title-Cascade_filling_system&oldid=695670697.

* cited by examiner

US 10,508,770 B2

COMPRESSED GAS DISPENSING

CROSS-REFERENCE TO RELATED APPLICATIONS

This application claims priority to European Patent Application 16170898.7, filed 23 May 2016 and U.S. Provisional Patent Application 62/356086, filed 29 Jun. 2016, each incorporated herein by reference.

All references cited herein are incorporated by reference to the maximum extent allowable by law. To the extent a reference may not be fully incorporated herein, it is incorporated by reference for background purposes and indicative of the knowledge of one of ordinary skill in the art.

BACKGROUND

There is growing interest to use hydrogen as a transportation fuel in cars, buses, trucks, and other vehicles. Hydrogen is generally stored in a fuel tank on-board the vehicles at high pressure. After most of the on-board hydrogen has been depleted, the pressure of the hydrogen in the fuel tank is reduced and the fuel tank must be refueled (refilled to a target pressure) with hydrogen.

Hydrogen may be supplied from high pressure storage vessels and/or liquid storage vessels. The cost of supplying an amount of hydrogen can depend on whether the source is liquid or compressed gas. Industry desires to supply hydrogen to fuel tanks on-board vehicles in a cost effective manner.

Industry desires improved methods and improved equipment for compressed gas dispensing.

Industry desires improved utilization of storage vessels used to transport compressed gas from a supply depot to a dispensing station, thereby reducing the frequency of transport of the compressed gas storage vessels.

Industry desires to reduce the use of compressors at dispensing stations due to required maintenance of compressors and power requirements of compressors.

Industry desires reliable supply of compressed gas at compressed gas dispensing stations.

The present invention may also be useful for dispensing other compressed gases such as natural gas.

BRIEF SUMMARY

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A method for dispensing a gas to a receiving vessel (111), the method comprising:
  transferring a first quantity of the gas from at least one of a first plurality of storage vessels (102, 103) or a gas source (114) to at least one storage vessel of a second plurality of storage vessels (104) via a compressor (105);
  transferring a second quantity of the gas from the gas source (114) to a first storage vessel (102) of the first plurality of storage vessels using a pressure difference between the gas in the gas source (114) and the gas in the first storage vessel (102) to transfer the second quantity of the gas while simultaneously transferring a third quantity of the gas from the gas source (114) to the receiving vessel (111) using a respective pressure difference between the gas of the gas source (114) and the gas in the receiving vessel (111) to transfer the third quantity of the gas; and
  transferring a fourth quantity of the gas from the at least one storage vessel of the second plurality of storage vessels (104) to the receiving vessel (111) using a respective pressure difference between the gas in the at least one storage vessel of the second plurality of storage vessels (104) and the gas in the receiving vessel (111) to transfer the fourth quantity of the gas, wherein the fourth quantity of the gas comprises at least a portion of the first quantity of the gas.

Aspect 2. The method of aspect 1 wherein the first quantity of the gas is transferred from the gas source (114) to the at least one storage vessel of the second plurality of storage vessels (104) simultaneous with the transfer of the second quantity of the gas from the gas source (114) to the first storage vessel (102) of the first plurality of storage vessels and the transfer of the third quantity of the gas from the gas source (114) to the receiving vessel (111).

Aspect 3. The method of aspect 1 or aspect 2 further comprising:
  transferring a fifth quantity of the gas from a second storage vessel (103) of the first plurality of storage vessels to the receiving vessel (111) using a respective pressure difference between the gas in the second storage vessel (103) of the first plurality of storage vessels and the gas in the receiving vessel (111).

Aspect 4. The method of aspect 3 further comprising:
  transferring a sixth quantity of the gas from the second storage vessel (103) of the first plurality of storage vessels to the receiving vessel (111) via the compressor (105) simultaneous with the transfer of the fourth quantity of the gas from the at least one storage vessel of the second plurality of storage vessels (104) to the receiving vessel (111) by the respective pressure difference.

Aspect 5. The method of any one of the preceding aspects further comprising:
  transferring a seventh quantity of the gas from the first storage vessel (102) of the first plurality of storage vessels to the receiving vessel (111) using a pressure difference between the gas in the first storage vessel (102) of the first plurality of storage vessels and the gas in the receiving vessel (111).

Aspect 6. The method of aspect 5 wherein the seventh quantity of the gas is transferred from the first storage vessel (102) of the first plurality of storage vessels to the receiving vessel (111) while simultaneously transferring an eighth quantity of the gas from the gas source (114) to the receiving vessel (111) using a respective pressure difference between the gas of the gas source (114) and the gas in the receiving vessel (111) to transfer the eighth quantity of the gas.

Aspect 7. The method of aspect 5 or aspect 6 wherein the seventh quantity of the gas is transferred from the first storage vessel (102) of the first plurality of storage vessels to the receiving vessel (111) while simultaneously transferring a ninth quantity of the gas from the gas source (114) to at least one storage vessel of the second plurality of storage vessels (104) via the compressor (105).

Aspect 8. The method of any one of the preceding aspects further comprising:

transferring a quantity of the gas from the gas source (114) to the receiving vessel (111) via the compressor (105) simultaneous with the transfer of one of the fourth quantity of the gas from the at least one storage vessel of the second plurality of storage vessels (104) to the receiving vessel (111) and a tenth quantity of the gas from at least one of the storage vessels of the second plurality of storage vessels (104) to the receiving vessel (111) using a respective pressure difference between the gas in the at least one storage vessel of the second plurality of storage vessels (104) and the gas in the receiving vessel (111) to transfer the tenth quantity of the gas, wherein the tenth quantity of the gas comprises at least a portion of the first quantity of the gas and/or the ninth quantity of the gas according to aspect 7.

Aspect 9. A dispensing station for dispensing gas to a receiving vessel (211), the dispensing station comprising:

a mobile compressed gas storage device (210) comprising a plurality of storage vessels (202, 203), each of the plurality of storage vessels (202, 203) having a control valve (220, 230) associated therewith for dispensing the gas from each respective storage vessel to the receiving vessel (211) using a respective pressure difference between the gas in the respective storage vessel and the gas in the receiving vessel (211); and fixed dispensing station components comprising:

a compressing means (205) operatively disposed to receive gas from each of the plurality of storage vessels of the mobile compressed gas storage device (210); and one or more fixed compressed gas storage vessels (204) operatively disposed to receive gas from the compressing means (205) and operatively disposed to dispense gas to the receiving vessel.

Aspect 10. The dispensing station of aspect 9 wherein all of the control valves (220, 230) associated with the plurality of storage vessels (202, 203) for dispensing to the receiving vessel (211) are fixed on the mobile compressed gas storage device (210).

Aspect 11. The dispensing station of aspect 9 or aspect 10 wherein all of the control valves (220, 230) associated with the plurality of storage vessels for dispensing to the receiving vessel (211) are operatively disposed to feed a common connector (225) connecting the mobile compressed gas storage device (210) to the fixed dispensing station components.

Aspect 12. The dispensing station of aspect 11 wherein the common connector (225) has a connector portion associated with the mobile compressed gas storage device (210) and a connector portion associated with the fixed dispensing station components, wherein the connector portion associated with the mobile compressed gas storage device (210) is disposed, preferably fixed, on the mobile compressed gas storage device (210).

Aspect 13. The dispensing station of any one of aspects 9 to 12 wherein each of the plurality of storage vessels (202, 203) have a control valve (222, 232) associated therewith for transferring gas from each respective storage vessel to the compressing means (205);

wherein all of the control valves associated with the plurality of storage vessels for transferring gas to the compressing means (205) are fixed on the mobile compressed gas storage device (210).

Aspect 14. The dispensing station of aspect 13 wherein all of the control valves (222, 232) associated with the plurality of storage vessels (202, 203) for transferring gas to the compressing means (205) are operatively disposed to feed a second common connector (235) connecting the mobile compressed gas storage device (210) to the fixed dispensing station components.

Aspect 15. The dispensing station of aspect 14 wherein the second common connector (235) has a connector portion associated with the mobile compressed gas storage device (210) and a connector portion associated with the fixed dispensing station components, wherein the connector portion of the second common connector (235) associated with the mobile compressed gas storage device (210) is disposed, preferably fixed, on the mobile compressed gas storage device (210).

Aspect 16. A method for dispensing a gas to a plurality of receiving vessels, the method comprising:

transferring a first quantity of the gas from a first storage vessel (202) of a plurality of storage vessels on a first mobile compressed gas storage device (210) to a receiving vessel (211) using a pressure difference between the gas in the first storage vessel (202) and the gas in the receiving vessel (211) to transfer the first quantity of gas;

transferring a second quantity of the gas from a second storage vessel (203) of the plurality of storage vessels on the first mobile compressed gas storage device (210) to the receiving vessel (211) using a pressure difference between the gas in the second storage vessel (203) and the gas in the receiving vessel (211) to transfer the second quantity of gas;

transferring a third quantity of the gas from at least one of the plurality of storage vessels on the first mobile compressed gas storage device (210) to one or more fixed compressed gas storage vessels (204) via a compressor (205);

transferring a fourth quantity of the gas from at least one of the one or more fixed compressed gas storage vessels (204) to the receiving vessel (211) using a pressure difference between the gas in the at least one of the one or more fixed compressed gas storage vessels (204) and the gas in the receiving vessel (211) to transfer the fourth quantity of gas, wherein the fourth quantity of gas comprises at least a portion of the third quantity of gas;

transporting the first mobile compressed gas storage device (210) to a refilling station after the first mobile compressed gas storage device has been depleted to a selected depletion level;

refilling the first mobile compressed gas storage device (210) at the refilling station;

transferring a fifth quantity of the gas from a first storage vessel (202') of a plurality of storage vessels on a second mobile compressed gas storage device (210') to a second receiving vessel (211') using a pressure difference between the gas in the first storage vessel (202') of the plurality of storage vessels on the second mobile compressed gas storage device (210') and the gas in the second receiving vessel (211') to transfer the fifth quantity of gas;

transferring a sixth quantity of the gas from a second storage vessel (203') of the plurality of storage vessels on the second mobile compressed gas storage device (210') to the second receiving vessel (211') using a pressure difference between the gas in the second storage vessel (203') of the plurality of storage vessels on the second mobile compressed gas storage device (210') and the gas in the second receiving vessel (211') to transfer the sixth quantity of gas;

transferring a seventh quantity of the gas from at least one of the plurality of storage vessels on the second mobile compressed gas storage device (210') to one or more of the fixed compressed gas storage vessels (204) via a compressor (205); and transferring an eighth quantity of the gas from the at least one or another of the one or more fixed storage vessels (204) to the second receiving vessel (211') using a pressure difference between the gas in the at least one or the other of the one or more fixed compressed gas storage vessels (204) and the gas in the second receiving vessel (211') to transfer the eighth quantity of gas, wherein the eighth quantity of gas comprises at least a portion of the seventh quantity of gas.

Aspect 17. The method of aspect 16 further comprising:

transferring a first quantity of a liquid from a liquid storage vessel (250) to the one or more fixed compressed gas storage vessels (204) via the compressor (205) or a fluid mover (255) thereby forming a ninth quantity of the gas in the one or more fixed compressed gas storage vessels (204);

transferring a tenth quantity of the gas from one or more of the plurality of storage vessels on the second mobile compressed gas storage device (210') to a third receiving vessel (211") using a respective pressure difference between each of the one or more of the plurality of storage vessels on the second mobile compressed gas storage device and the gas in the third receiving vessel (211") to transfer the tenth quantity of gas; and subsequent to the transfer of the tenth quantity of gas, transferring an eleventh quantity of gas from at least one of the one or more fixed compressed gas storage vessels (204) to the third receiving vessel (211") using a pressure difference between the gas in the at least one of the one or more fixed compressed gas storage vessels (204) and the gas in the third receiving vessel (211") to transfer the eleventh quantity of gas, wherein the eleventh quantity of gas comprises at least a portion of the ninth quantity of gas.

Aspect 18. The method of aspect 17 further comprising:

transferring a twelfth quantity of gas from the at least one or another of the one or more fixed compressed gas storage vessels (204) to a fourth receiving vessel (211''') using a pressure difference between the gas in the at least one or the other of the one or more fixed compressed gas storage vessels (204) and the gas in the fourth receiving vessel (211''') to transfer the twelfth quantity of gas;

wherein the gas is transferred to the fourth receiving vessel (211''') from only the one or more fixed compressed gas storage vessels (204) to increase the pressure of the gas in the fourth receiving vessel (211''') from an initial pressure of the gas in the fourth receiving vessel to a target final pressure for the fourth receiving vessel.

Aspect 19. The method of aspect 18 wherein the twelfth quantity of gas is transferred from the one or more fixed compressed gas storage vessels (204) to the fourth receiving vessel (211''') when the storage vessels on the second mobile compressed gas storage device (210') each contain the gas at a pressure less than the initial pressure of the gas in the fourth receiving vessel (211''').

Aspect 20. The method of aspect 17 or aspect 18 or aspect 19 wherein the third receiving vessel (211") contains the gas at a target final pressure after receiving the eleventh quantity of gas;

wherein the second mobile compressed gas storage device (210') has a total number of storage vessels mounted on the second mobile compressed gas storage device (210'); and wherein the eleventh quantity of the gas is transferred from the at least one of the one or more fixed compressed gas storage vessels (204) to the third receiving vessel (211") when the pressure of the gas in each and every one of the total number of storage vessels mounted on the second mobile compressed gas storage device (210') is determined to be insufficient to provide the target final pressure of gas in the third receiving vessel (211"").

Aspect 21. The method of any one of aspects 16 to 20 further comprising:

transferring a thirteenth quantity of gas from the first storage vessel (202') of the plurality of storage vessels on the second mobile compressed gas storage device (210') to a fifth receiving vessel (211"") using a pressure difference between the gas in the first storage vessel (202') and the gas in the fifth receiving vessel (211"") to transfer the thirteenth quantity of gas;

subsequent to the transfer of the thirteenth quantity of gas, transferring a fourteenth quantity of the gas from the second storage vessel (203') of the plurality of storage vessels on the second mobile compressed gas storage device to the fifth receiving vessel (211"") using a pressure difference between the gas in the second storage vessel (203') and the gas in the fifth receiving vessel (211"") to transfer the fourteenth quantity of gas;

wherein the gas is transferred to the fifth receiving vessel from only the second mobile compressed gas storage device to increase the pressure of the compressed gas in the fifth receiving vessel from an initial starting pressure to a target final pressure for the fifth receiving vessel (211"").

Aspect 22. The method of any one of aspects 17 to 21 wherein the liquid storage vessel (250) is a fixed liquid storage vessel.

Aspect 23. The method of any one of aspects 17 to 21 wherein the liquid storage vessel (250) is a mobile liquid storage vessel.

Aspect 24. The method of any one of aspects 17 to 23 wherein the first quantity of liquid is transferred from a liquid storage vessel (250) to the one or more fixed compressed gas storage vessels (204) via the fluid mover (255), and wherein the fluid mover (255) receives the first quantity of liquid from the liquid storage vessel (250) in liquid form.

Aspect 25. The method of the preceding aspect wherein the fluid mover (255) discharges a first quantity of effluent as a liquid or a supercritical fluid, the first quantity of effluent formed from the first quantity of liquid, the method further comprising heating the first quantity of effluent from the fluid mover (255) to form the ninth quantity of the gas.

Aspect 26. The method of any one of aspects 16 to 25 further comprising transferring a quantity of the gas from at least one of the plurality of storage vessels (202, 203) of the plurality of storage vessels on the first mobile compressed gas storage device (210) to the receiving vessel (211) via the compressor (205).

Aspect 27. The method of aspect 26 wherein the transfer of the quantity of the gas from the at least one of the storage vessels (202, 203) of the plurality of storage vessels on the first mobile compressed gas storage device (210) to the receiving vessel (211) via the compressor (205) is simultaneous with the transfer of the fourth quantity of gas from the at least one of the one or more fixed compressed gas storage vessels (204) to the receiving vessel (211).

Aspect 28. A method for dispensing a compressed gas into a plurality of receiving vessels at a compressed gas dispensing station (10) comprising a mobile compressed gas storage device (300), a liquid storage vessel (350), and one or more fixed compressed gas storage vessels (311), the method comprising:

operatively connecting a first receiving vessel (371) of the plurality of receiving vessels to the compressed gas dispensing station (10), the first receiving vessel (371) containing the compressed gas at an initial pressure;

transferring a first quantity of the compressed gas from a first storage vessel (302) of a plurality of storage vessels on the mobile compressed gas storage device (300) to the first receiving vessel (371) of the plurality of receiving vessels using a pressure difference between the compressed gas in the first storage vessel (302) and the compressed gas in the first receiving vessel (371) to transfer the first quantity of compressed gas;

subsequent to the transfer of the first quantity of compressed gas, transferring a second quantity of the compressed gas from a second storage vessel (303) of the plurality of storage vessels on the mobile compressed gas storage device (300) to the first receiving vessel (371) using a pressure difference between the compressed gas in the second storage vessel (303) and the compressed gas in the first receiving vessel (371) to transfer the second quantity of compressed gas;

wherein the compressed gas is transferred to the first receiving vessel (371) from only the mobile compressed gas storage device (300) to increase the pressure of the compressed gas in the first receiving vessel (371) from the initial pressure to a target final pressure for the first receiving vessel;

transferring a first quantity of a liquid from the liquid storage vessel (350) to the one or more fixed compressed gas storage vessels (311) via a fluid mover (110) thereby forming a third quantity of the compressed gas in the one or more fixed compressed gas storage vessels (311);

operatively connecting a second receiving vessel (372) of the plurality of receiving vessels to the compressed gas dispensing station (10);

transferring a fourth quantity of the compressed gas from one or more of the plurality of storage vessels (302, 303) on the mobile compressed gas storage device (300) to the second receiving vessel (372) of the plurality of receiving vessels using a respective pressure difference between each of the one or more of the plurality of storage vessels (302, 303) and the compressed gas in the second receiving vessel (372) to transfer the fourth quantity of compressed gas;

subsequent to the transfer of the fourth quantity of compressed gas, transferring a fifth quantity of the compressed gas from at least one of the one or more fixed compressed gas storage vessels (311) to the second receiving vessel (372) using a pressure difference between the compressed gas in the at least one of the one or more fixed compressed gas storage vessels (311) and the compressed gas in the second receiving vessel (372) to transfer the fifth quantity of compressed gas, wherein the fifth quantity of compressed gas comprises at least a portion of the third quantity of compressed gas;

operatively connecting a third receiving vessel (373) of the plurality of receiving vessels to the compressed gas dispensing station (10), the third receiving vessel (373) containing the compressed gas at an initial pressure; and transferring a sixth quantity of the compressed gas from the at least one or another of the one or more fixed compressed gas storage vessels (311) to the third receiving vessel (373) of the plurality of receiving vessels using a pressure difference between the compressed gas in the at least one or the other of the one or more fixed compressed gas storage vessels (311) and the compressed gas in the third receiving vessel (373) to transfer the sixth quantity of compressed gas;

wherein the compressed gas is transferred to the third receiving vessel (373) from only the one or more fixed compressed gas storage vessels (311) to increase the pressure of the compressed gas in the third receiving vessel (373) from the initial pressure of the compressed gas in the third receiving vessel (373) to a target final pressure for the third receiving vessel (373).

Aspect 29. The method of aspect 28 wherein the mobile compressed gas storage device (300) has a total number of storage vessels mounted on the mobile compressed gas storage device (300); and wherein the fifth quantity of the compressed gas is transferred from the at least one of the one or more fixed compressed gas storage vessels (311) to the second receiving vessel (372) when the pressure of the compressed gas in each and every one of the total number of storage vessels mounted on the mobile compressed gas storage device (300) is determined to be insufficient to provide a target pressure of compressed gas in the second receiving vessel (372).

Aspect 30. The method of aspect 28 or aspect 29 wherein the sixth quantity of the compressed gas is transferred from the one or more fixed compressed gas storage vessels (311) to the third receiving vessel (373) when the storage vessels on the mobile compressed gas storage device (300) each contain the compressed gas at a pressure less than the initial pressure of the compressed gas in the third receiving vessel (373) or when there are no mobile compressed gas storage devices operatively connected to the compressed gas dispensing station (10).

Aspect 31. The method of any one of aspects 28 to 30 wherein the liquid storage vessel (350) is a fixed liquid storage vessel.

Aspect 32. The method of any one of aspects 28 to 30 wherein the liquid storage vessel (350) is a mobile liquid storage vessel.

Aspect 33. The method of any one of preceding aspects 28 to 32 further comprising:

operatively connecting a second mobile compressed gas storage device (400) comprising a plurality of storage vessels to the compressed gas dispensing station (10);

operatively connecting a fourth receiving vessel (374) of the plurality of receiving vessels to the compressed gas dispensing station (10), the fourth receiving vessel (374) containing the compressed gas at an initial pressure;

transferring a seventh quantity of the compressed gas from a first storage vessel (402) of the plurality of storage vessels on the second mobile compressed gas storage device (400) to the fourth receiving vessel (374) of the plurality of receiving vessels using a pressure difference between the compressed gas in the first storage vessel (402) on the second mobile compressed gas storage device and the compressed gas in the fourth receiving vessel (374) to transfer the seventh quantity of compressed gas; and subsequent to the transfer of the seventh quantity of compressed gas, transferring an eighth quantity of the compressed gas from a second storage vessel (403) of the plurality of storage vessels on the second mobile compressed gas storage device (400) to the fourth receiving vessel (374) using a pressure difference between the compressed gas in the second storage vessel (403) on the second mobile compressed gas storage device and the compressed gas in the fourth receiving vessel (374) to transfer the eighth quantity of compressed gas;

wherein the compressed gas is transferred to the fourth receiving vessel (374) from only the second mobile compressed gas storage device (400) to increase the pressure of the compressed gas in the fourth receiving vessel from the initial pressure to a target pressure for the fourth receiving vessel.

Aspect 34. The method of aspect 33 further comprising:

transporting the mobile compressed gas storage device (300) to a compressed gas supply depot after the compressed gas on the mobile compressed gas storage device (300) has been depleted to a selected depletion level;

recharging the mobile compressed gas storage device (300) with the compressed gas at the compressed gas supply depot;

transporting the mobile compressed gas storage device (300) to the compressed gas dispensing station (10);

operatively connecting the mobile compressed gas storage device (300) to the compressed gas dispensing station (10);

operatively connecting a fifth receiving vessel (375) of the plurality of receiving vessels to the compressed gas dispensing station (10), the fifth receiving vessel (375) containing the compressed gas at an initial pressure;

transferring a ninth quantity of the compressed gas from the first storage vessel (302) of the plurality of storage vessels on the mobile compressed gas storage device (300) to the fifth receiving vessel (375) of the plurality of receiving vessels using a pressure difference between the compressed gas in the first storage vessel (302) on the mobile compressed gas storage device and the compressed gas in the fifth receiving vessel (375) to transfer the ninth quantity of compressed gas; and subsequent to the transfer of the ninth quantity of compressed gas, transferring an tenth quantity of the compressed gas from the second storage vessel (303) of the plurality of storage vessels on the mobile compressed gas storage device (300) to the fifth receiving vessel (375) using a pressure difference between the compressed gas in the second storage vessel (303) on the mobile compressed gas storage device (300) and the compressed gas in the fifth receiving vessel (375) to transfer the tenth quantity of compressed gas;

wherein the compressed gas is transferred to the fifth receiving vessel (375) from only the mobile compressed gas storage device (300) to increase the pressure of the compressed gas in the fifth receiving vessel from the initial pressure to a target pressure for the fifth receiving vessel.

Aspect 35. The method of any one of aspects 28 to 34 wherein the first receiving vessel (371) is refilled to the target pressure using only compressed gas from the mobile compressed gas storage device (300).

Aspect 36. The method of any one of aspects 28 to 35 wherein the third receiving vessel (373) is refilled to the target pressure using only compressed gas from the one or more fixed compressed gas storage vessels (311).

Aspect 37. The method of any one of aspects 28 to 36 wherein the fluid mover (110) receives the first quantity of liquid from the liquid storage vessel (350) in liquid form.

Aspect 38. The method of aspect 37 wherein the fluid mover (110) discharges a first quantity of effluent as a liquid or a supercritical fluid, the first quantity of effluent formed from the first quantity of liquid, the method further comprising heating the first quantity of effluent from the fluid mover (110) to form the third quantity of the compressed gas.

Aspect 39. The method of any one of aspects 28 to 38 further comprising:

transferring a quantity of compressed gas from one or more of the of the plurality of storage vessels (302, 303) on the mobile compressed gas storage device (300) to one or more of the fixed compressed gas storage vessels (311) via the fluid mover (110).

Aspect 40. The method of aspect 39 further comprising:

operatively connecting another receiving vessel (376) of the plurality of receiving vessels to the compressed gas dispensing station (10); and transferring a quantity of compressed gas from one or more of the fixed compressed gas storage vessels (311) to the other receiving vessel (376) using the pressure difference between the compressed gas in the one or more fixed compressed gas storage vessels (311) and the compressed gas in the other receiving vessel (376) to transfer the quantity of compressed gas, wherein the quantity of compressed gas transferred from the one or more of the fixed compressed gas storage vessels (311) to the other receiving vessel (376) comprises at least a portion of the quantity of compressed gas transferred from the one or more of the plurality of storage vessels (302, 303) on the mobile compressed gas storage device (300) to the one or more of the fixed compressed gas storage vessels (311) via the fluid mover (110).

Aspect 41. The method of any one of aspects 28 to 40 wherein the first receiving vessel (371) is refilled to the target pressure for the first receiving vessel (371) and then disconnected from the compressed gas dispensing station (10).

Aspect 42. The method of any one of aspects 28 to 41 wherein the second receiving vessel (372) is disconnected from the compressed gas dispensing station (10) after refilling the second receiving vessel (372) to the target pressure for the second receiving vessel (372) by using compressed gas from the mobile compressed gas storage device (300) and the at least one of the one of more fixed compressed gas storage vessels (311).

Aspect 43. The method of any one of aspects 28 to 42 wherein the third receiving vessel (373) is disconnected from the compressed gas dispensing station (10) after refilling the third receiving vessel (373) to the target pressure for the third receiving vessel (373).

Aspect 41. The method of any one of aspects 1 to 27 wherein the gas is hydrogen or any one of aspects 28 to 43 wherein the compressed gas is hydrogen.

DETAILED DESCRIPTION OF THE PREFERRED EMBODIMENTS

Figure 1A:
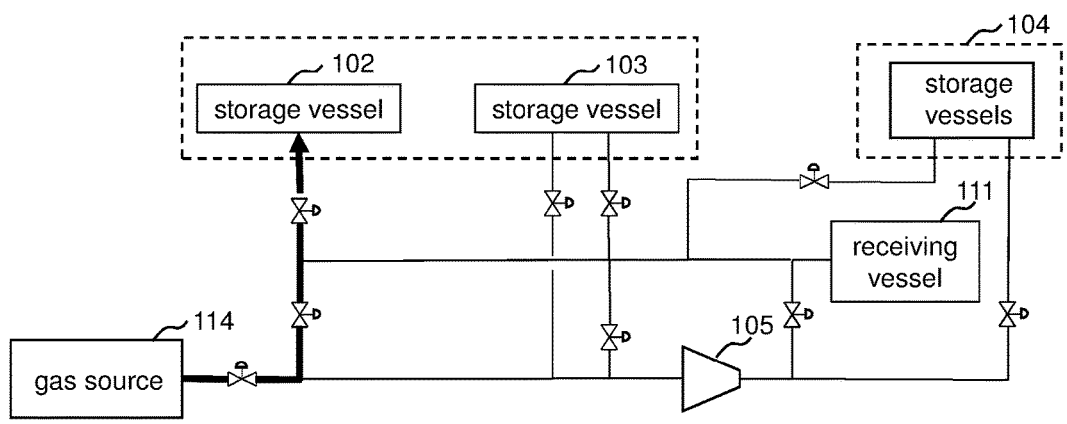
FIGS. 1*a-y* illustrate steps available for a second compressed gas dispensing method.

The present disclosure relates to methods and apparatus for dispensing a compressed gas into a receiving vessel. The compressed gas may be natural gas. The compressed gas may be hydrogen and the receiving vessel may be a hydrogen storage tank of a vehicle such as a car, truck, bus, forklift, or other vehicle. As used herein, the term compressed gas includes gases and supercritical fluids.

EP2174057B1 discloses one such method for dispensing hydrogen from a hydrogen source into a receiving vessel onboard a vehicle. The present disclosure describes a number of various alternative dispensing methods.

The methods are described with reference to the figures. The thicker lines denote the path of the compressed gas during the various steps.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

As used herein, "first," "second," "third," etc. are used to distinguish from among a plurality of steps and/or features, and is not indicative of the total number, or relative position in time and/or space unless expressly stated as such.

The terms "mobile" and "fixed" have their normal meaning. For example, a mobile storage vessel is storage vessel that is transported from a (compressed gas and/or liquid) supply depot to the dispensing station and then returned to be recharged after the fluid (compressed gas or liquid) has been sufficiently depleted. A fixed storage vessel is a storage vessel that is fixed at the dispensing station where the fixed storage vessel is not transported to a supply depot during the course of normal operation. A fixed storage vessel is charged from another mobile storage device, which is transported from a supply depot with liquid or compressed gas and offloaded to the fixed storage vessel. A supply depot may be located at a production facility for producing compressed gas and/or liquid, or may be a bulk storage facility. A bulk storage facility may be supplied by pipeline or other means. A supply depot may supply compressed gas and/or liquid to respective mobile storage devices.

As used herein, pressures are gauge pressures unless otherwise specifically stated.

The present methods use the well-known cascade dispensing approach. In cascade dispensing, the compressed gas is dispensed to a receiving vessel from multiple supply vessels in succession, where each succeeding supply vessel has an increasingly higher pressure of the compressed gas contained therein.

Cascade dispensing is described, for example, in U.S. Pat. Nos. 5,406,988, 6,779,568, 6,786,245 8,156,970 B2, 8,453, 682 B2, 8,899,278 B2, and EP2174057B1, each incorporated herein by reference.

Figure 1B:
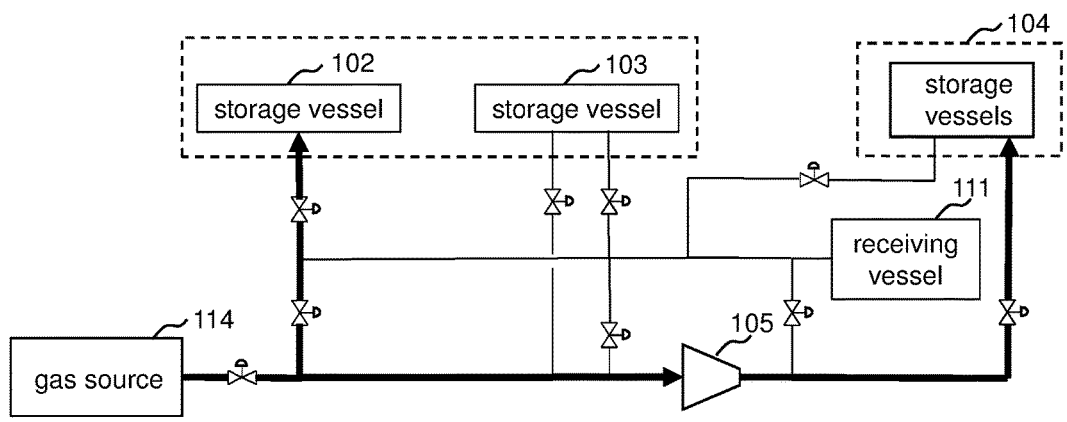
Figure 1C:
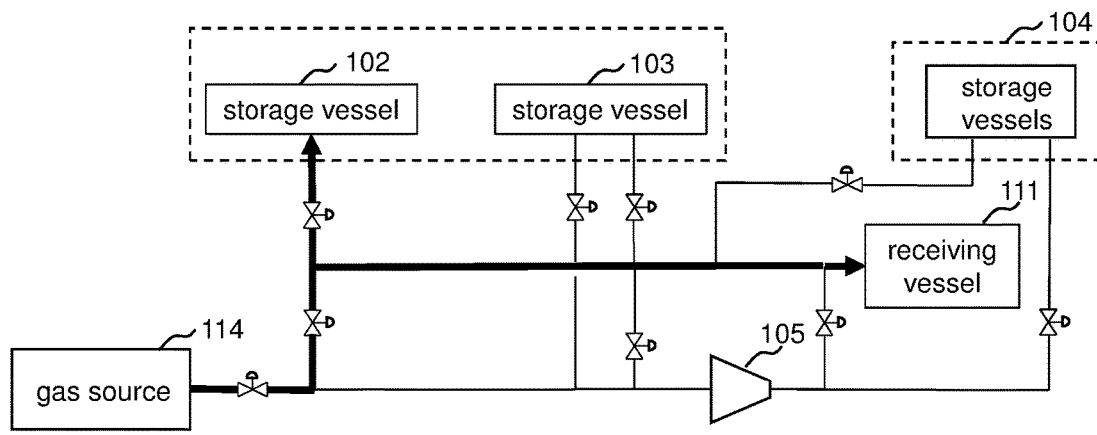
Figure 1D:
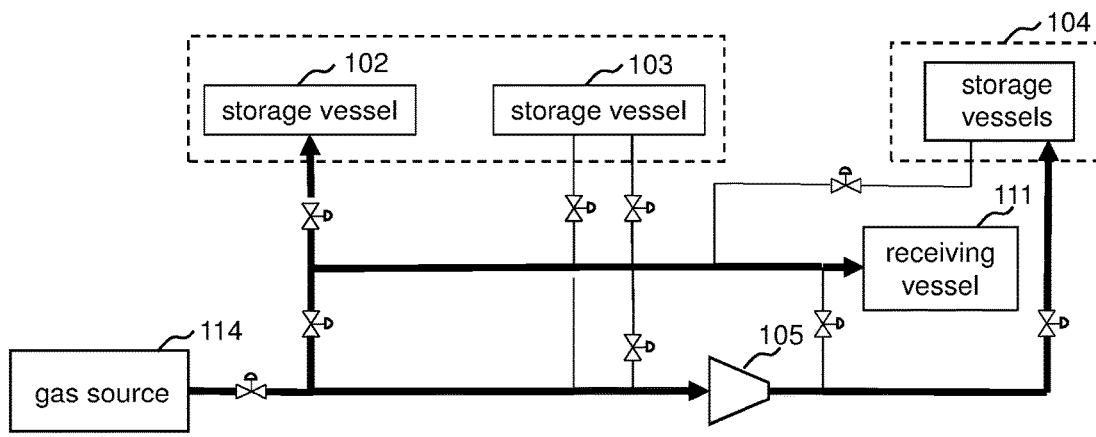
Figure 1E:
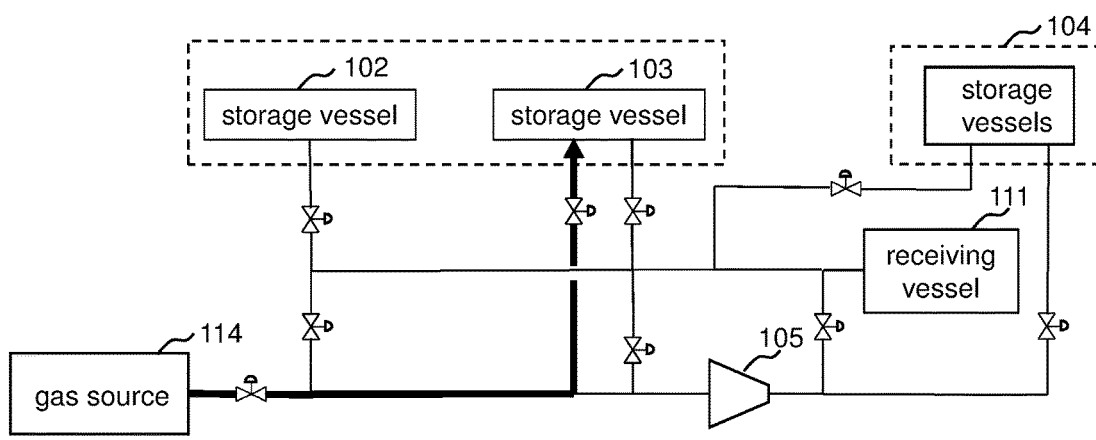
Figure 1F:
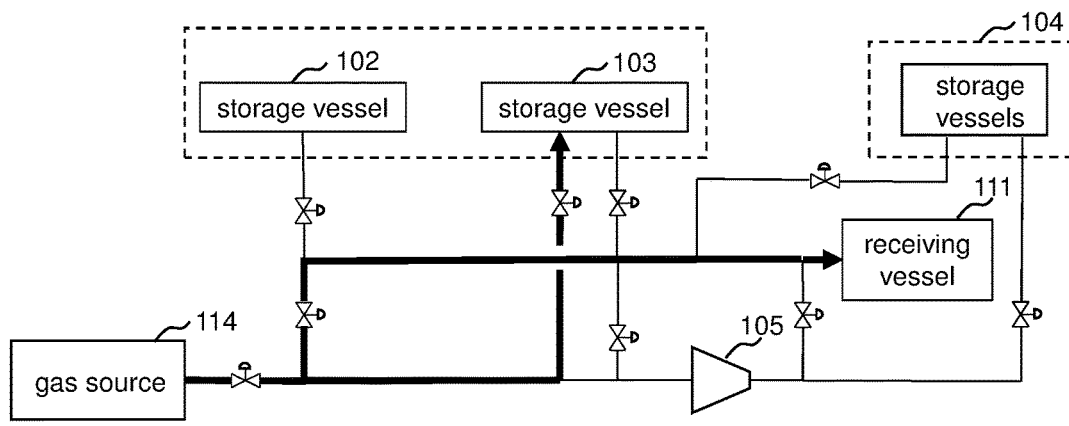
Figure 1G:
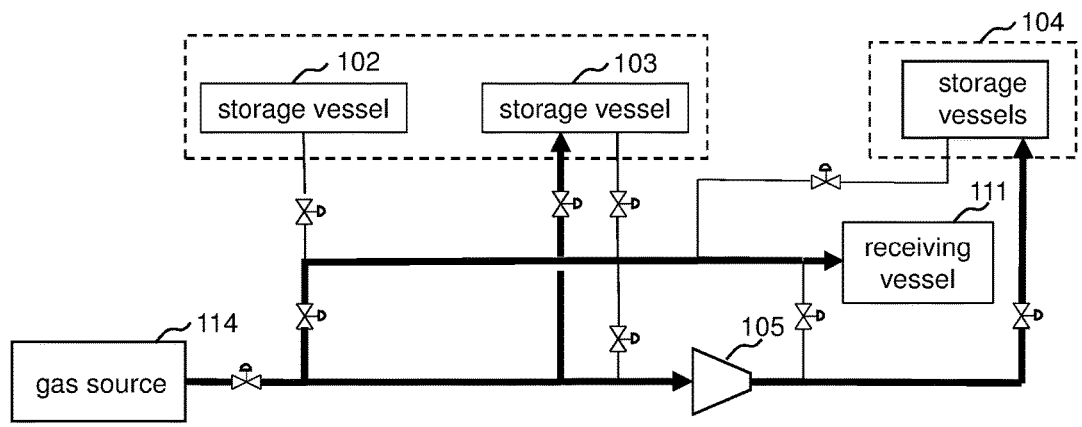
Figure 1H:
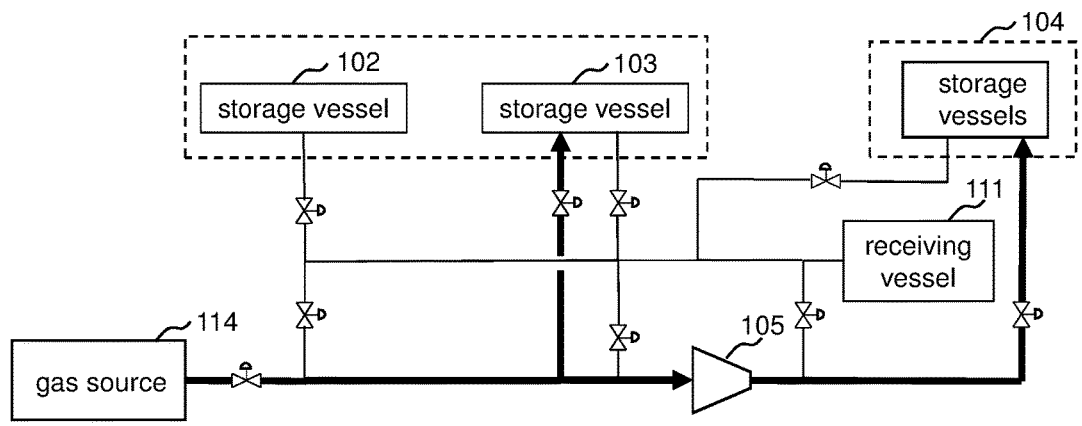
Figure 1I:
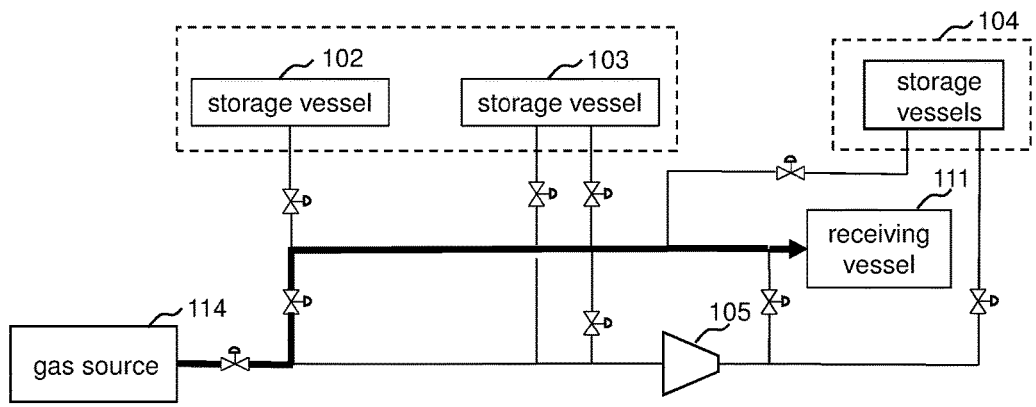
Figure 1J:
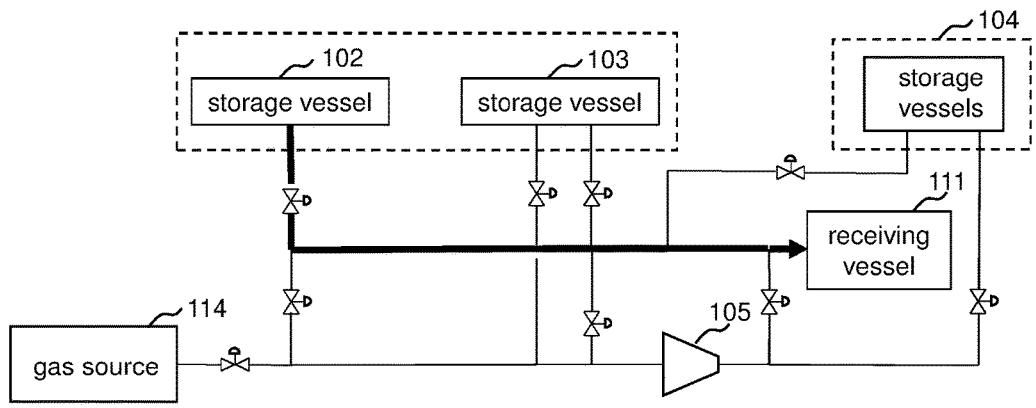
Figure 1K:
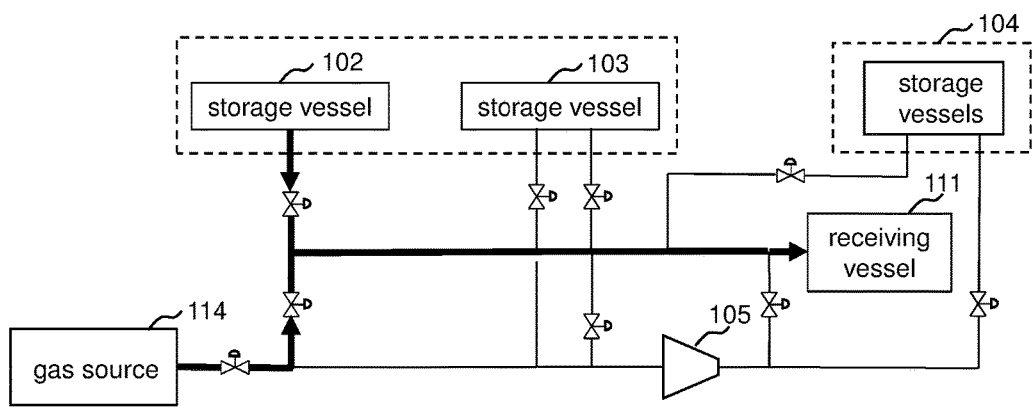
Figure 1L:
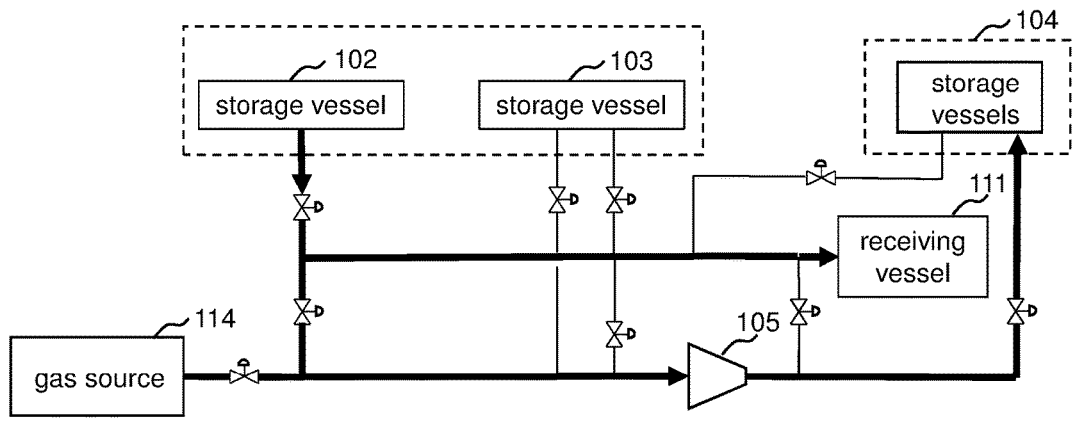
Figure 1M:
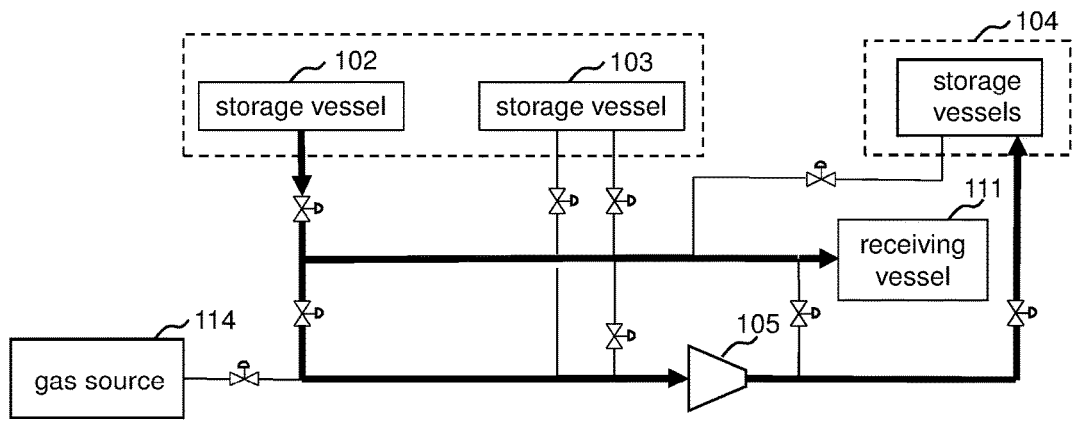
Figure 1N:
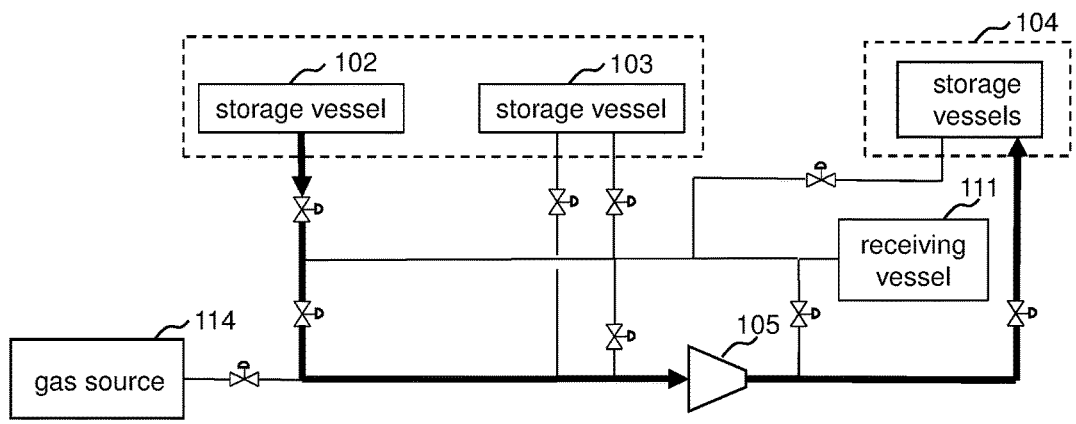
Figure 1O:
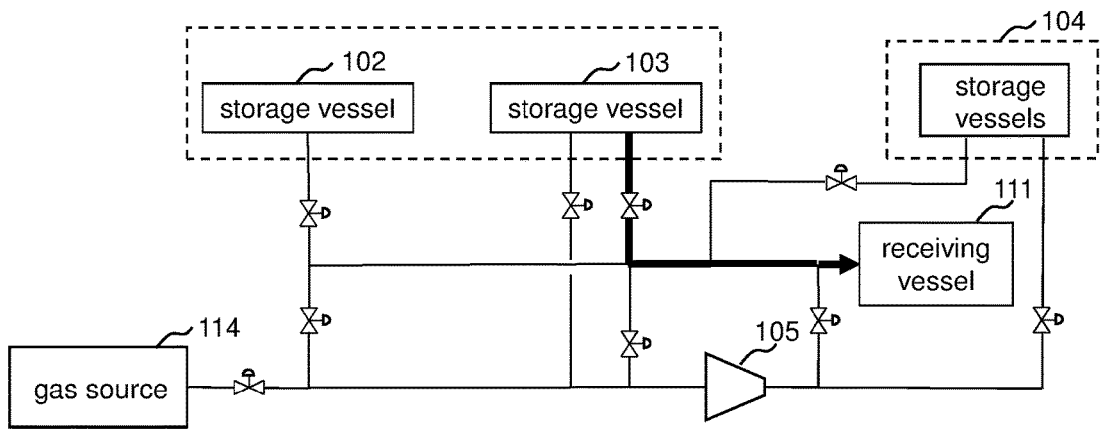
Figure 1P:
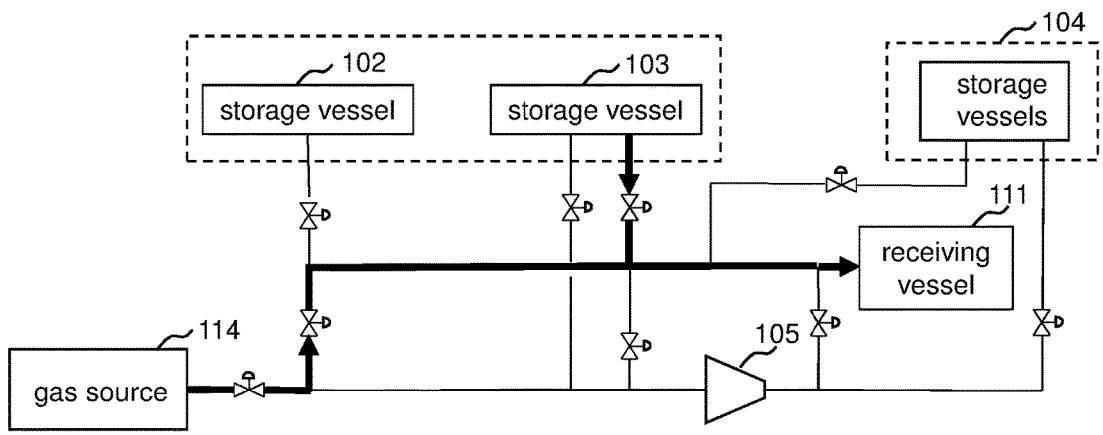
Figure 1Q:
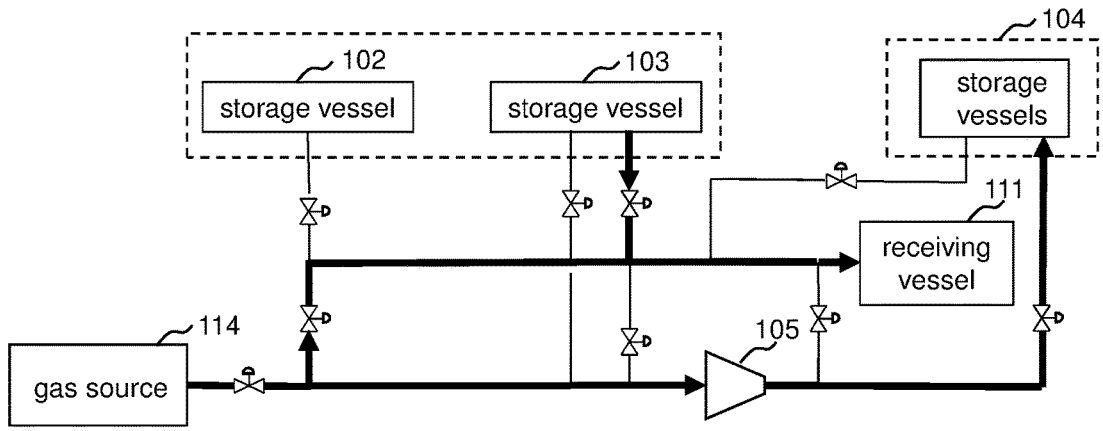
Figure 1R:
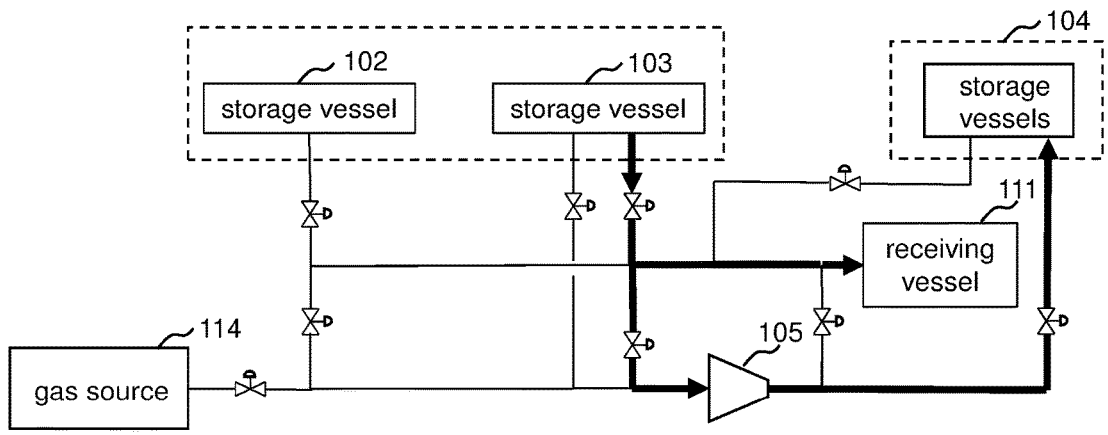
Figure 1S:
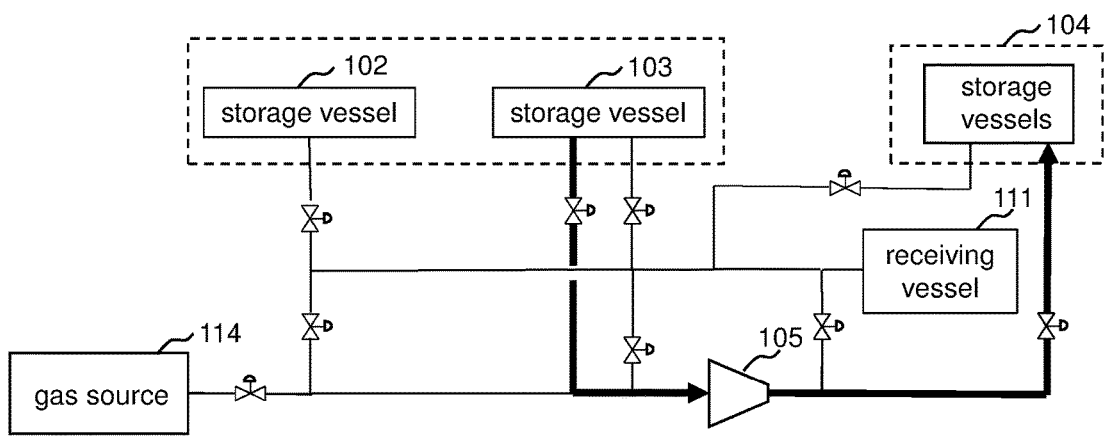
Figure 1T:
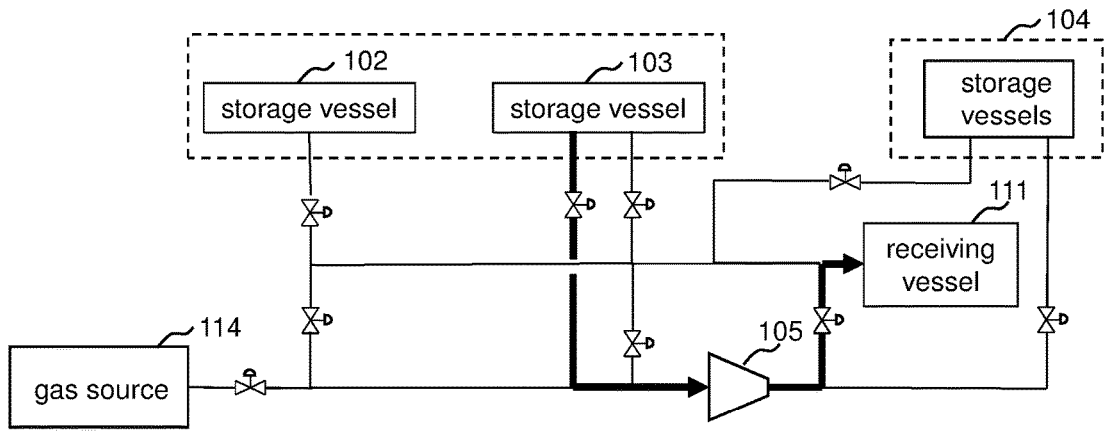
Figure 1U:
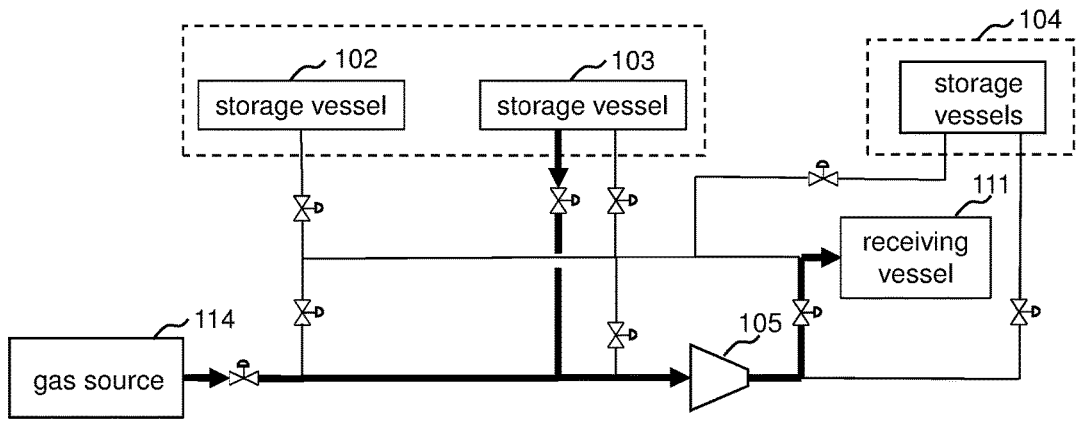
Figure 1V:
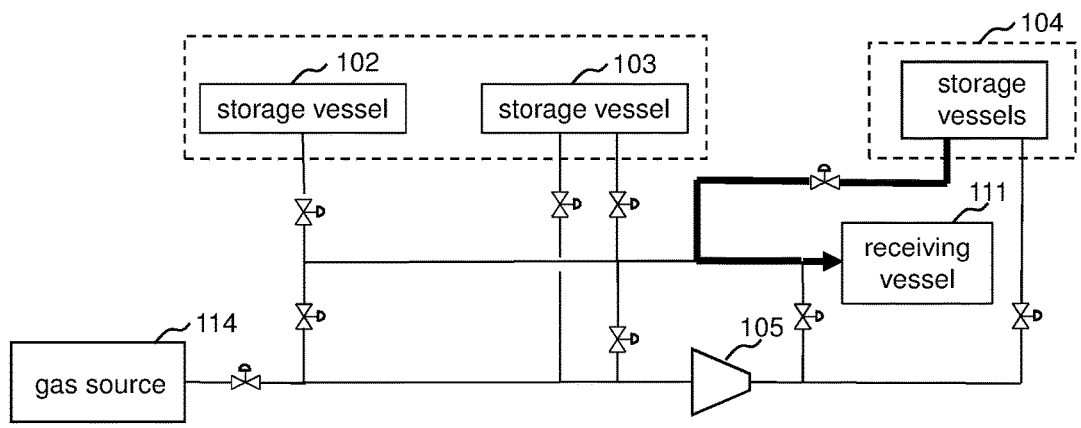
Figure 1W:
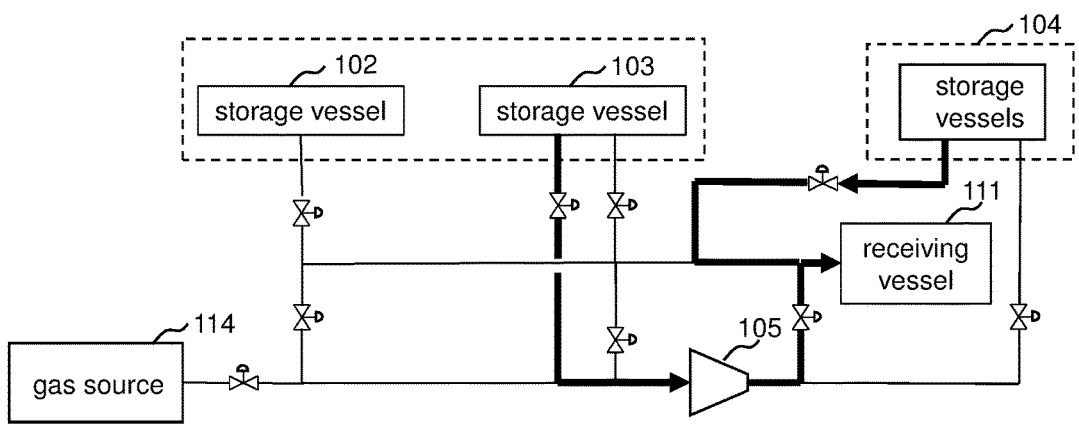
Figure 1X:
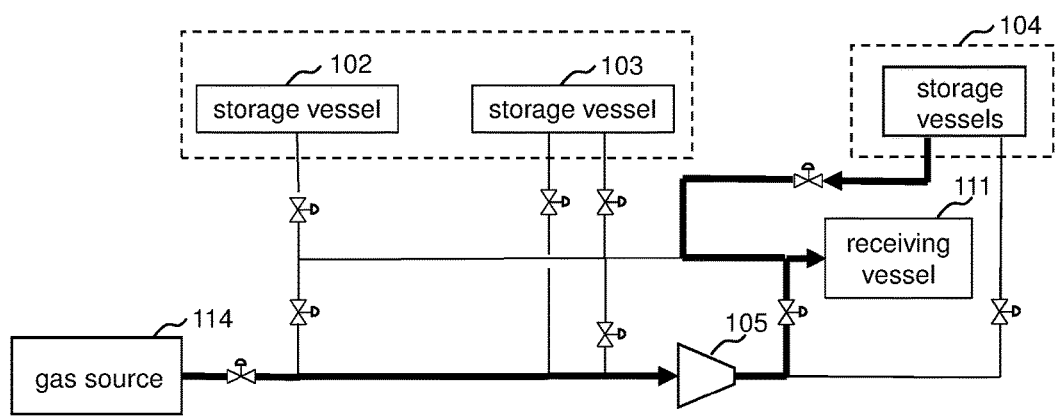
Figure 1Y:
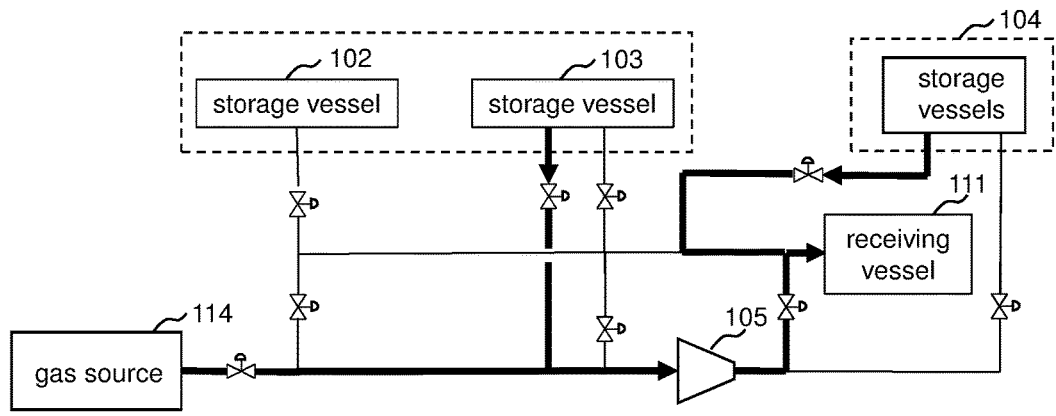

A first method, with its various steps and optional steps, is described in FIGS. 1a-y. FIGS. 1a-y illustrate an exemplary process flow diagram for carrying out the first method. The lines and valves shown are only exemplary, and various configurations could be used to carry out the first method. Quantities of gas are transferred via the various steps.

The dispensing system includes a high pressure gas source 114, which could be any suitable high pressure source for the compressed gas. In case of hydrogen dispensing, the high pressure gas source 114 could be a hydrogen tube trailer, or the like. The first method is particularly suitable for relatively high pressure hydrogen sources like tube trailers. The high pressure gas source 114 may be mobile, meaning that the high pressure gas source 114 may be filled at a compressed gas depot, brought to the compressed gas dispensing station, offloaded at the dispensing station, and then returned again to the compressed gas depot for refilling.

The dispensing system comprises a first plurality of storage vessels 102, 103. While only two storage vessels are shown, the first plurality of storage vessels 102, 103 may include any number of high pressure storage vessels. The high pressure storage vessels 102, 103 may have a maximum pressure rating of, for example, 50 MPa. The first plurality of storage vessels 102, 103 may be fixed at the compressed gas dispensing station. The first plurality of storage vessels 102, 103 are intended to be fixed at the dispensing station and compressed gas transferred to the first plurality of storage vessels from a gas source, rather than the first plurality of storage vessels themselves being transported to a compressed gas depot for refilling.

The dispensing system also comprises a second plurality of storage vessels 104. The second plurality of storage vessels 104 may include any number of high pressure storage vessels. The second plurality of storage vessels may have a maximum pressure rating of, for example, 90 MPa. The second plurality of storage vessels 104 may be fixed at the compressed gas dispensing station. The second plurality of storage vessels 104 are intended to be fixed at the dispensing station and compressed gas transferred to the second plurality of storage vessels from a gas source, rather than the second plurality of storage vessels themselves being transported to a compressed gas depot for refilling.

The dispensing system also comprises gas compressing means 105, which can be a single stage compressor, a multistage compressor, or multiple compressors.

In the first method, the first plurality of storage vessels 102, 103 may be charged or recharged with compressed gas from the high pressure gas source 114.

The high pressure gas source 114 may comprise a plurality of storage vessels containing the compressed gas at high pressure as is the case for e.g. a tube trailer. In a fully charged state, the storage vessels of the gas source 114 may contain the compressed gas at a pressure of at least 30 MPa, or at least 40 MPa, or at leat 50 MPa. The storage vessels of the high pressure gas source 114 may contain the compressed gas each at a pressure at least as high as a maximum pressure rating for the first plurality of storage vessels.

As shown in FIG. 1a, a first storage vessel 102 of the first plurality of storage vessels can be charged from the high pressure gas source 114 using a pressure difference between one or more of the storage vessels of the high pressure gas source 114 and the first storage vessel 102 of the first plurality of storage vessels.

As used herein, transfer of compressed gas "using a pressure difference" means that the pressure difference of the compressed gas in the vessels providing and receiving the compressed gas is the sole driving force for transfer of the compressed gas from the vessel providing compressed gas to the vessel receiving the compressed gas. No compressor or the like is used to effect transfer of the compressed gas.

The transfer of the compressed gas may continue until the pressure difference between the one or more storage vessels of the high pressure gas source 114 and the first storage vessel 102 of the first plurality of storage vessels is decreased to a desired amount. No compressor is used to transfer the compressed gas from the high pressure gas source 114 to the first storage vessel 102 of the first plurality of storage vessels. The dispensing system for the first method may be operatively configured such that the gas compressing means 105 is not suitable for compressing the compressed gas from the high pressure gas source 114 and transferring the compressed from the gas compressing means to the first storage vessel 102 of the first plurality of storage vessels. Compressed gas may be transferred from the high pressure gas source 114 to the first storage vessel 102 only by means of a pressure difference between the pressure in one or more of the vessels of the high pressure gas source 114 and the first storage vessel 102; the pressure difference is the driving force for transfer of the compressed gas.

As shown in FIG. 1b, while compressed gas is being charged from the high pressure gas source 114 to the first storage vessel 102, compressed gas may be simultaneously passed from the high pressure gas source 114 to the gas compressing means 105, and from the gas compressing means 105 to one or more of the second plurality of storage vessels 104.

A preferred step in the first method is shown in FIG. 1c. In this step, while compressed gas is being charged into the first storage vessel 102, compressed gas is simultaneously being dispensed from the gas source 114 to the receiving vessel 111. This solves a problem in prior art methods where the dispensing station is taken offline and not used for dispensing to receiving vessels when the storage vessels are being charged from the gas source 114.

FIG. 1d shows an additional or alternative preferred step in the first method that also solves the problem in prior art methods where the dispensing station is taken offline and not used for dispensing to receiving vessels when the storage vessels are being charged from the gas source 114. In this step, while compressed gas is being charged into the first storage vessel 102 and being charged into one or more of the second plurality of storage vessels 104 via the compressing means 105, compressed gas is simultaneously being dispensed from the gas source 114 to the receiving vessel 111.

Additional storage vessels of the first plurality of storage vessels can be charged from the high pressure gas source 114 as shown in FIG. 1e. A second storage vessel 103 of the first plurality of storage vessels may be charged from the high pressure gas source 114 using a pressure difference between one or more of the storage vessels of the high pressure gas source 114 and the second storage vessel 103 of the first plurality of storage vessels. The transfer of the compressed gas may continue until the pressure difference between the one or more storage vessels of the high pressure gas source 114 and the second storage vessel 103 of the first plurality of storage vessels is decreased to a desired amount. No compressor is used to transfer the compressed gas from the high pressure gas source 114 to the second storage vessel 103 of the first plurality of storage vessels. The dispensing system for the first method may be operatively configured such that the gas compressing means 105 is not suitable for compressing the compressed gas from the high pressure gas source 114 and transferring the compressed gas from the gas compressing means to the second storage vessel 103. Compressed gas may be transferred from the high pressure gas source 114 to the second storage vessel 103 only by means of a pressure difference between the pressure in one or more of the vessels of the high pressure gas source 114 and the second storage vessel 103; the pressure difference is the driving force for transfer of the compressed gas.

No compressor is used to transfer the compressed gas from the high pressure gas source 114 to any of the first plurality of storage vessels. The dispensing system for the first method may be operatively configured such that the gas compressing means 105 is not suitable for compressing the compressed gas from the high pressure gas source 114 and transferring the compressed gas from the gas compressing means to any of the first plurality of storage vessels.

FIG. 1f shows an additional or alternative preferred step in the first method that also solves the problem in prior art methods where the dispensing station is taken offline and not used for dispensing to receiving vessels when the storage vessels are being charged from the gas source 114. In this step, while compressed gas is being charged into the second storage vessel 103 of the first plurality of storage vessels, compressed gas is simultaneously being dispensed from the gas source 114 to the receiving vessel 111.

FIG. 1g shows an additional or alternative preferred step in the first method that also solves the problem in prior art methods where the dispensing station is taken offline and not used for dispensing to receiving vessels when the storage vessels are being charged from the gas source 114. In this step, while compressed gas is being charged into the second storage vessel 103 of the first plurality of storage vessels and being charged into one or more of the second plurality of storage vessels 104 via the compressing means 105, compressed gas is simultaneously being dispensed from the gas source 114 to the receiving vessel 111.

As shown in FIG. 1h, while compressed gas is being charged from the high pressure gas source 114 to the second storage vessel 103, compressed gas may be simultaneously passed from the high pressure gas source 114 to the gas compressing means 105, and from the gas compressing means 105 to one or more of the second plurality of storage vessels 104.

If the high pressure gas source 114 is present when it is desired to dispense to a receiving vessel 111 and the pressure of the compressed gas in one or more of the storage vessels onboard the high pressure gas source 114 is sufficient, compressed gas may be dispensed from the high pressure gas source 114 to the receiving vessel 111 as shown in FIG. 1*i*.

Compressed gas may be dispensed from the fixed compressed gas storage at the compressed gas dispensing station. As shown in FIG. 1*j*, compressed gas may be dispensed from a first storage vessel 102 of the first plurality of storage vessels to the receiving vessel 111. Compressed gas may be transferred from the first storage vessel 102 of the first plurality of storage vessels using a pressure difference between the first storage vessel 102 and the receiving vessel 111 without the use of a compressor. The transfer of the compressed gas may continue until the pressure difference between the two vessels is decreased to a desired amount.

As shown in FIG. 1*k*, while compressed gas is being dispensed from the first storage vessel 102 of the first plurality of storage vessels to the receiving vessel 111, compressed gas may be simultaneously dispensed from the high pressure gas source 114 if the pressure of the compressed gas in the high pressure gas source 114 is sufficient.

As shown in FIG. 1*l*, while compressed gas is being dispensed from the first storage vessel 102 of the first plurality of storage vessels to the receiving vessel 111, and compressed gas is simultaneously dispensed from the high pressure gas source 114, compressed gas from the high pressure gas source 114 may be compressed to charge one or more of the second plurality of storage vessels 104.

While compressed gas is being dispensed from the first storage vessel 102 of the first plurality of storage vessels to the receiving vessel 111, compressed gas from the first storage vessel 102 of the first plurality of storage vessels may also be compressed in gas compression means 105 and passed to one or more of the storage vessels of the second plurality of storage vessels 104 as shown in FIG. 1*m*.

Even when compressed gas is not being dispensed from the first storage vessel 102 of the first plurality of storage vessels, compressed gas from the first storage vessel 102 of the first plurality of storage vessels may be compressed in gas compression means 105 and passed to one or more of the storage vessels of the second plurality of storage vessels 104 as shown in FIG. 1*n*.

As per the cascade filling technique, compressed gas may be dispensed from a second storage vessel 103 of the first plurality of storage vessels to the receiving vessel 111 as shown in FIG. 1*o*. The second storage vessel 103 at the beginning of dispensing to the receiving vessel 111 contains the compressed gas at a higher pressure than the first storage vessel 102 at the end of dispensing to the receiving vessel 111.

Compressed gas may be transferred from the second storage vessel 103 of the first plurality of storage vessels using a pressure difference between the second storage vessel 103 and the receiving vessel 111 without the use of a compressor. The transfer of the compressed gas may continue until the pressure difference between the two vessels is decreased to a desired amount.

In case the pressure of the compressed gas in the high pressure source 114 is high enough, compressed gas from the high pressure gas source 114 may be blended with the compressed gas from the second storage vessel 103 of the first plurality of storage vessel and is charged into the receiving vessel 111, as shown in FIG. 1*p*. As shown in FIG. 1*q*, compressed gas from the high pressure source 114 may additionally be passed to the gas compressing means 105 and then charged into one or more of the second plurality of storage vessels 104.

As shown in FIG. 1*r*, while compressed gas is being dispensed from the second storage vessel 103 of the first plurality of storage vessels, compressed gas from the second storage vessel 103 of the first plurality of storage vessels may be fed to the gas compressing means 105 and the compressed gas from the gas compressing means passed to one or more of the second plurality of storage vessels 104. Using compressed gas from the second storage vessel 103 having compressed gas at a high pressure facilitate the ability to maintain much higher pressure in at least one of the second plurality of storage vessels 104.

Even when compressed gas is not being dispensed from the second storage vessel 103 of the first plurality of storage vessels, compressed gas from the second storage vessel 103 of the first plurality of storage vessels may be compressed in gas compression means 105 and passed to one or more of the storage vessels of the second plurality of storage vessels 104 as shown in FIG. 1*s*.

The dispensing method may proceed with corresponding steps using other storage vessels of the first plurality of storage vessels. At no time during dispensing from one of the first plurality of storage vessels is compressed gas simultaneously withdrawn from more than one of the first plurality of storage vessels. The compressor does not supply compressed gas to the receiving tank 111 from a gas source including any of the first plurality of storage vessels during any part of dispensing from another storage vessel of the first plurality of storage vessels.

As shown in FIG. 1*t*, compressed gas from the second storage vessel 103 of the first plurality of storage vessels may be compressed in the gas compressing means 105 and passed to the receiving vessel 111.

In case the pressure of the compressed gas in the high pressure source 114 is available and suitable, compressed gas from the high pressure gas source 114 may be blended with the compressed gas from the second storage vessel 103 of the first plurality of storage vessel, compressed in gas compressing means 105 and charged into the receiving vessel 111, as shown in FIG. 1*u*.

Cascade filling of the receiving vessel 111 may then continue with dispensing from one or more of the second plurality of storage vessels 104 as shown in FIG. 1*v*. One or more cascade filling steps may be performed depending on how many second plurality of storage vessels 104 there are.

As shown in FIG. 1*w*, while compressed gas is being dispensed from one or more of the storage vessels of the second plurality of storage vessels 104 to the receiving vessel 111, compressed gas may be simultaneously dispensed from the second storage vessel 103 of the first plurality of storage vessels via the gas compressing means 105 to the receiving vessel 111.

In case the pressure of the compressed gas in the high pressure source 114 is available and suitable, compressed gas may be simultaneously dispensed from the high pressure gas source 114 via the gas compressing means 105 to the receiving vessel 111 while compressed gas is being dispensed from one or more of the storage vessels of the second plurality of storage vessels 104 to the receiving vessel 111, as shown in FIG. 1*x*.

In case the pressure in the second storage vessel 103 of the first plurality of storage vessels is suitable, and the pressure of the compressed gas in the high pressure gas source 114 is available and suitable, compressed gas from the second storage vessel 103 and the high pressure gas source 114 may be blended, compressed in gas compressing means 105, and charged into the receiving vessel 111 simultaneous with compressed gas from one or more of the storage vessels of second plurality of storage vessels 104, as shown in FIG. 1y.

At no time during this first method is compressed gas from the second plurality of storage vessels 104 used as a source by the gas compressing means 105. This feature where compressed gas from the storage vessels is not used as a source by the gas compressing means 105 is a feature that characterizes the second plurality of storage vessels 104 from the first plurality of storage vessels 102, 103.

In a preferred embodiment of the first method, a first quantity of gas from at least one of a first plurality of storage vessels 102, 103 or a gas source 114 is transferred to at least one storage vessel of a second plurality of storage vessels 104 via a compressor 105 according to one or more of the steps shown in FIGS. 1b, 1d, 1g, 1h, 1l, 1m, 1n, 1q, 1r, and 1s.

In the preferred embodiment of the first method, a second quantity of gas from the gas source 114 is transferred to a storage vessel of the first plurality of storage vessels 102, 103 using a pressure difference between the gas in the gas source 114 and the gas in the storage vessel to transfer the second quantity of gas while simultaneously transferring a third quantity of gas from the gas source 114 to the receiving vessel 111 using a respective pressure difference between the gas in the gas source 114 and the gas in the receiving vessel 111 to transfer the third quantity of gas. This may be accomplished according to one or more of the steps shown in FIGS. 1c, 1d, 1f, and 1g.

The transfer of the first quantity of gas may be simultaneous with the transfer of the second quantity and third quantity of gas as shown in FIGS. 1d and 1g.

In the preferred embodiment of the first method, a fourth quantity of gas from the at least one storage vessel of the second plurality of storage vessels 104 is transferred to the receiving vessel 111 using a pressure difference between the gas in the at least one storage vessel of the second plurality of storage vessels 104 and the gas in the receiving vessel 111 to transfer the fourth quantity of gas. This may be accomplished according to one or more of the steps shown in FIGS. 1v, 1w, 1x, and 1y.

The first method may comprise transferring a fifth quantity of gas from a second storage vessel 103 of the first plurality of storage vessels to the receiving vessel 111 using a pressure difference between the gas in the second storage vessel 103 of the first plurality of storage vessels and the gas in the receiving vessel 111. This may be accomplished according to one or more of the steps shown in FIGS. 1o, 1p, 1q, and 1r.

Subsequent to the transfer of the fifth quantity of gas from the second storage vessel 103, the first method may comprise transferring a sixth quantity of gas from the second storage vessel 103 to the receiving vessel 111 via compressor 105 simultaneous with the transfer of the fourth quantity of gas from a storage vessel of the second plurality of storage vessels 104 to the receiving vessel by a pressure difference. This may be accomplished according to one or more of the steps shown in FIGS. 1w and 1y.

A second method, with its various steps and optional steps, is described in FIGS. 2a-j. FIGS. 2a-j illustrate an exemplary process flow diagram for carrying out the second method. The piping and valves shown are only exemplary, and various configurations could be used to carry out the second method. Quantities of gas are transferred via the various steps.

The second method is a method for dispensing gas into one or more receiving vessels at the compressed gas dispensing station. The one or more receiving vessels may be fuel tanks on board various types of transportation vehicles.

The dispensing station for carrying out the second method comprises a mobile compressed gas storage device 210 comprising a plurality of storage vessels 202, 203. While only two are shown, the plurality of storage vessels 202, 203 may include any desired number of high pressure storage vessels. Each of the plurality of storage vessels 202, 203 have a control valve 220 (for 202), 230 (for 203) associated therewith for dispensing gas from each respective storage vessel to the receiving vessel 211 using a pressure difference between the gas in the respective storage vessel and the gas in the receiving vessel 211. It follows that gas may be dispensed from the storage vessel 202 via the control valve 220 associated with storage vessel 202 to the receiving vessel 211 using a pressure difference between the gas in the storage vessel 202 and gas in the receiving vessel 211 and gas may be dispensed from the storage vessel 203 via the control valve 230 associateed with storage vessel 203 to the receiving vessel 211 using a pressure difference between the gas in storage vessel 203 and the gas in the receiving vessel 211. A higher pressure of the compressed gas in the respective storage vessel provides the driving force for transfer of the compressed gas to the receiving vessel having compressed gas at a lower pressure, i.e. at a pressure which is lower than the pressure of the compressed gas in the respective storage vessel from which the gas is transferred. No compressor is used to effect the transfer of the compressed gas from the respective storage vessel to the receiving vessel. Since the pressure of the gas exiting the dispensing nozzle of the dispensing station, which is operatively connected to the receiving vessel, is roughly equivalent to the pressure of the gas in the receiving vessel, it can be equivalently stated that the gas is dispensed using the pressure difference between the gas in the respective storage vessel and the gas exiting the dispensing nozzle of the dispensing station.

The plurality of storage vessels 202, 203 may include any number of high pressure storage vessels. The high pressure storage vessels 202, 203 may have a maximum pressure rating of, for example, 50 MPa or 90 MPa. The mobile compressed gas storage device 210 is mobile, meaning that the mobile compressed gas storage device 210 may be filled at a compressed gas depot, brought to the compressed gas dispensing station, used as a source of compressed gas at the compressed gas dispensing station, and after the compressed gas is depleted to a selected depletion level, returned again to the compressed gas depot to be recharged with compressed gas. The use of storage vessels with high pressure compressed gas onboard a mobile compressed gas storage device provides the benefit of reducing the reliance on a gas compressor at the dispensing station and reducing the associated power requirements of the gas compressor at the dispensing station.

Figure 3:
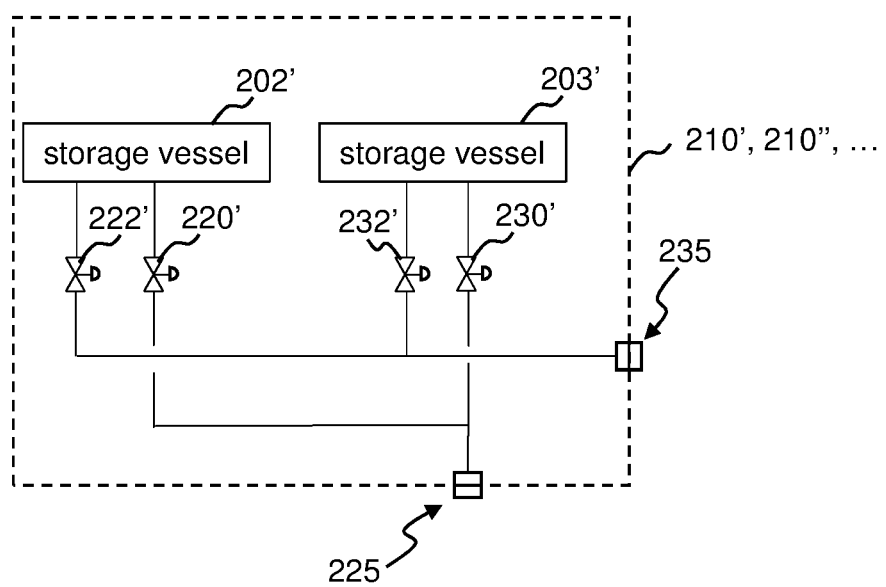
FIG. 3 shows a second mobile compressed gas storage device that can replace the mobile compressed gas storage device in FIGS. 2a-j.

The mobile compressed gas storage device 210 may be designed and configured to be readily swapped out with another mobile compressed gas storage device 210', shown in FIG. 3, upon being depleted of compressed gas. The second mobile compressed gas storage device 210' has a plurality of storage vessels 202', 203', pipes, valves 220', 222', 230', 232', and connectors associated therewith. Additional similar mobile compressed gas storage devices 210'', etc. with respective storage vessels, pipes, valves, and connectors may also be configured to be readily swapped into and out of the dispensing station.

The dispensing station may be operated using more than one mobile compressed gas storage device 210 at a time and when cascade dispensing to a receiving vessel, may withdraw from more than one mobile compressed gas storage device when dispensing to the receiving vessel as described in U.S. Pat. No. 8,453,682.

The mobile compressed gas storage devices 210, 210', etc. arrive at the compressed gas dispensing station charged with compressed gas.

The dispensing station comprises fixed dispensing station components. The fixed dispensing station components comprise a compressing means 205, and one or more fixed storage vessels 204.

The compressing means can be a single stage compressor, a multistage compressor, or multiple compressors. The compressing means 205 is operatively disposed to receive gas from each of the plurality of storage vessels of the mobile compressed gas storage device 210 and/or gas from a fluid source 250. The compressing means 205 is or can be operatively connected with the mobile compressed gas storage device 210 and/or a fluid source 250 to receive gas from each of the plurality of storage vessels of the mobile compressed gas storage device 210 and/or gas from the fluid source 250.

The one or more fixed storage vessels 204 are operatively disposed to receive gas from the compressing means 205 and operatively disposed to dispense gas to the receiving vessel 211. The one or more fixed storage vessels 204 are operatively connected with the compressing means 205 and can be operatively connected with the receiving vessel 211 to dispense gas to the receiving vessel 211.

The one or more fixed storage vessels 204 may include any number of high pressure storage vessels. The one or more fixed storage vessels may have a maximum pressure rating of, for example, 90 MPa. The one or more fixed storage vessels 204 are fixed at the compressed gas dispensing station. The one or more fixed storage vessels 204 may be charged with gas from one or more mobile compressed gas storage devices.

The mobile compressed gas storage device 210 arrives at the dispensing station charged with compressed gas. The gas compressing means 205 is not used to charge any of the storage vessels 202, 203 of the mobile compressed gas storage device 210. None of the storage vessels 202, 203 of the mobile compressed gas storage device 210 is charged at the dispensing station.

All of the control valves 220, 230 associated with the plurality of storage vessels 202, 203 for dispensing to the receiving vessel 211 may be fixed on the mobile compressed gas storage device 210. All of the control valves 220, 230 associated with the plurality of storage vessels for dispensing to the receiving vessel 211 may be operatively connected to a common connector 225, i.e. operatively disposed to feed a common connector 225 connecting the mobile compressed gas storage device 210 to the fixed dispensing station components. These features provide the advantage of reducing the number of pipe connections between the mobile compressed gas storage device 210 and the fixed dispensing station components. In case each of the control valves is part of the fixed dispensing station components, each of the plurality of storage vessels would need to be connected separately to the fixed dispensing station components, thereby increasing the number of high pressure connections. Reducing the number of high pressure connections decreases the risk of gas leaks.

Each of the plurality of storage vessels 202, 203 may have a control valve 222 (for 202), 232 (for 203) associated therewith for transferring gas from each respective storage vessel to the compressing means 205. It follows that gas may be dispensed from the storage vessel 202 via the control valve 222 associated with storage vessel 202 to the compressing means 205 and gas may be dispensed from the storage vessel 203 via the control valve 232 associated with storage vessel 203 to the compressing means 205. All of the control valves 222, 232 for transferring gas to the compressing means 205 may be fixed on the mobile compressed gas storage device 210. All of the control valves 222, 232 for transferring gas to the compressing means 205 may be operatively connected to a common connector 235, i.e. operatively disposed to feed a common connector 235 connecting the mobile compressed gas storage device 210 to the fixed dispensing station components.

These features provide the advantage of reducing the number of pipe connections between the mobile compressed gas storage device 210 and the fixed dispensing station components. In case each of the control valves is part of the fixed dispensing station components, each of the plurality of storage vessels would need to be connected separately to the fixed dispensing station components, thereby increasing the number of high pressure connections. Reducing the number of high pressure connections decreases the risk of gas leaks.

The compressed gas dispensing station may further comprise a liquid storage source, such as a liquid storage vessel 250. The liquid storage vessel 250 may be a fixed liquid storage vessel or a mobile liquid storage vessel.

With the addition of the liquid storage vessel, the compressed gas dispensing station is capable of having both compressed gas storage and liquid storage available. Dispensing of compressed gas sourced from the high pressure mobile compressed gas storage device 210 or sourced from the liquid storage vessel 250 can be decided based on economics and availability of the stored product in liquid or compressed gas form.

In case the liquid in the liquid storage vessel 250 is higher cost than the compressed gas in the mobile compressed gas storage device, the dispensing station may preferentially dispense the compressed gas from the mobile compressed gas storage device 210. In case the compressed gas in the mobile compressed gas storage device 210 becomes depleted, the dispensing station may dispense compressed gas sourced from the liquid storage vessel 250.

The liquid storage vessel 250 may be any suitable storage vessel for storing the desired product, for example, hydrogen. Storage vessels for storing liquid hydrogen are well-known. The liquid storage vessel 250 may be a fixed liquid storage vessel where liquid from a supply trailer is off-loaded to the fixed liquid storage vessel. The liquid storage vessel 250 may be mobile liquid storage vessel mounted on a trailer where the mobile liquid storage vessel itself is transported back and forth between a supply depot and the dispensing station.

The compressed gas dispensing station may also comprise a fluid mover 255, which can be a pump or compressor. The fluid mover may be capable of pumping liquid, gas, and two-phase mixtures of liquid and gas from the liquid source to the one or more fixed compressed gas storage vessels 311. U.S. Pat. No. 5,243,821 discloses a suitable fluid mover. A suitable cryogenic hydrogen compressor system is available commercially from Air Products and Chemicals, Inc. (cf. http://www.airproducts.com/microsite/2013_hydrogen_support/33969_cryogenic_hydrogen_compressor_ds.pdf). Various models (CHC-3000, CHC-3000, CHC-6000, CHC-7000 and CHC-30000) are available depending on the required flow and pressure ratings.

Figure 2A:
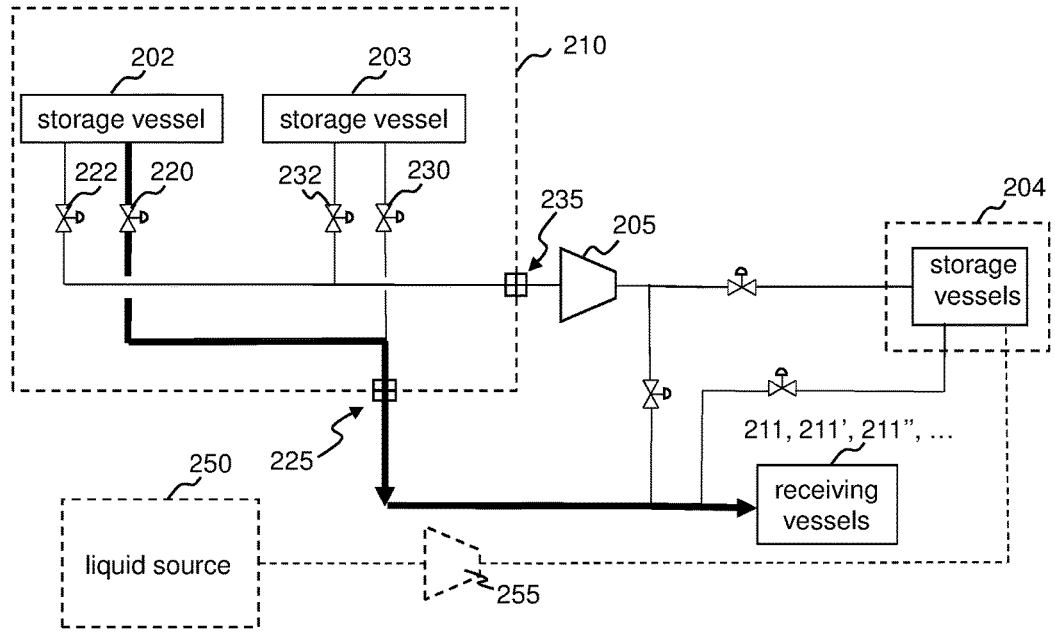
FIGS. 2a-j illustrate steps available for a third compressed gas dispensing method.

Compressed gas may be dispensed from the mobile compressed gas storage device 210 at the compressed gas dispensing station. As shown in FIG. 2a, compressed gas may be dispensed from a first storage vessel 202 of the plurality of storage vessels of the mobile compressed gas storage device 210 to the receiving vessel 211. Compressed gas may be transferred from the first storage vessel 202 of the plurality of storage vessels using a pressure difference between the gas in the first storage vessel 202 and the gas in the receiving vessel 211 without the use of a compressor (or equivalently using the pressure difference between the gas in the first storage vessel 202 and the gas exiting the dispensing nozzle without the use of a compressor). The transfer of the compressed gas may continue until the pressure difference between the two vessels is decreased to a desired amount.

Figure 2B:
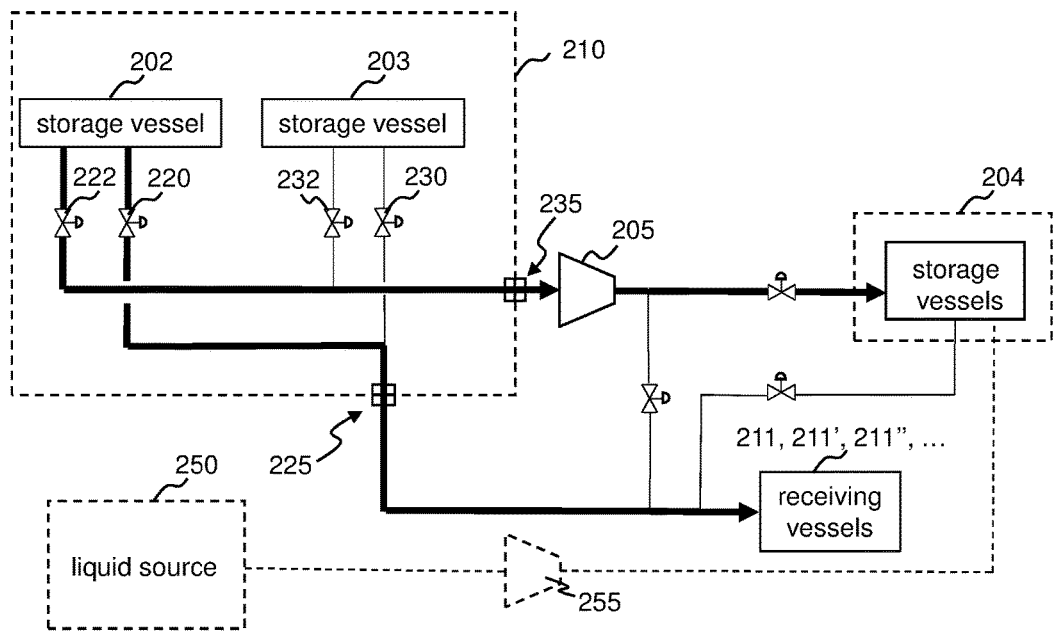

While compressed gas is being dispensed from the first storage vessel 202 of the plurality of storage vessels of the mobile compressed gas storage device 210 to the receiving vessel 211, compressed gas from the first storage vessel 202 of the plurality of storage vessels may also be compressed in gas compression means 205 and passed to one or more of the fixed compressed gas storage vessels 204 as shown in FIG. 2b.

Figure 2C:
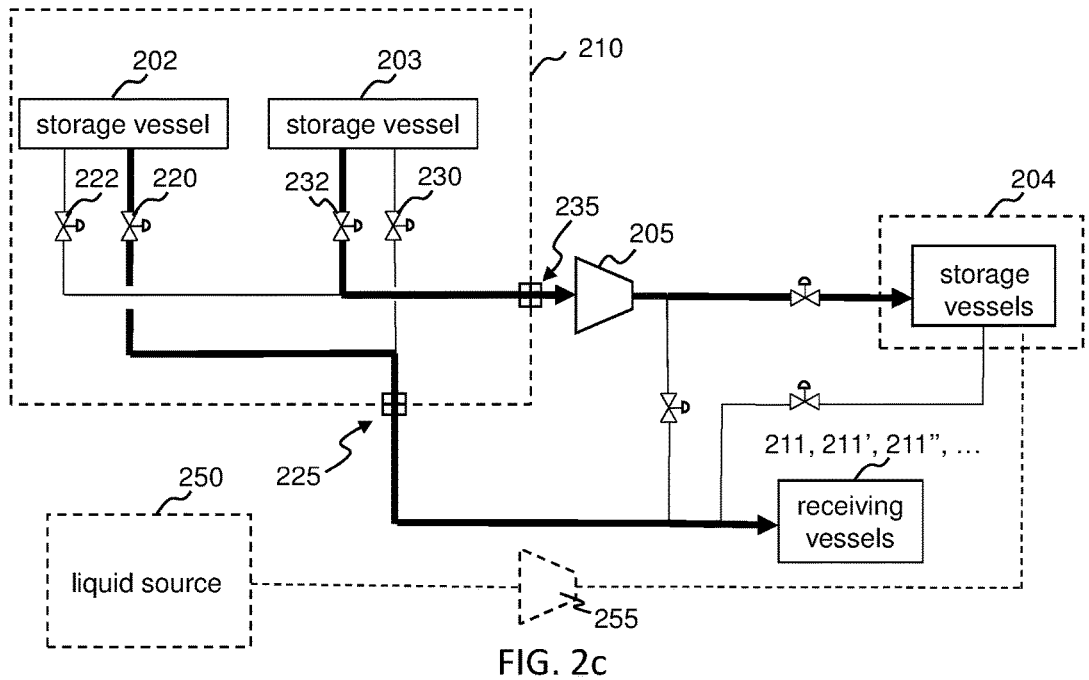

While compressed gas is being dispensed from the first storage vessel 202 of the plurality of storage vessels to the receiving vessel 211, compressed gas from the second storage vessel 203 of the plurality of storage vessels may be compressed in gas compression means 205 and passed to one or more of the fixed compressed gas storage vessels 204 as shown in FIG. 2c.

Compressed gas from the mobile compressed gas storage device 210 is compressed in gas compression means 205 to form the higher pressure compressed gas in the one or more fixed compressed gas storage vessels 204.

Figure 2D:
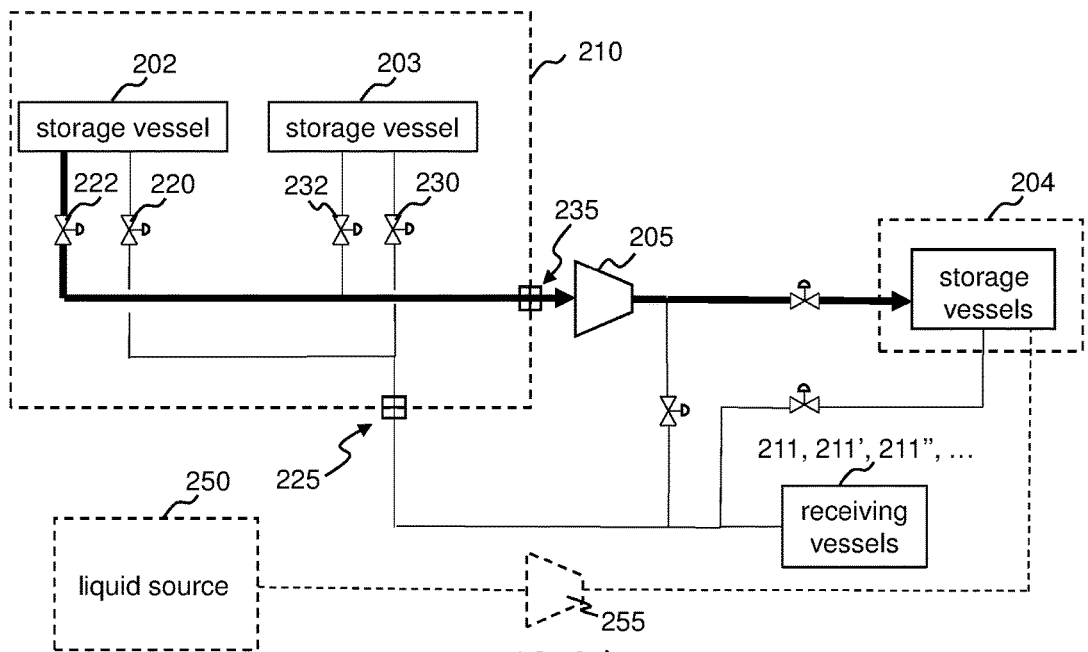

Even when compressed gas is not being dispensed from the first storage vessel 202 of the plurality of storage vessels of the mobile compressed gas storage device 210, compressed gas from the first storage vessel 202 of the plurality of storage vessels may be compressed in gas compression means 205 and passed to the one or more fixed compressed gas storage vessels 204 as shown in FIG. 2d. Likewise, compressed gas from any of the storage vessels of the plurality of storage vessels of the mobile compressed gas storage device 210 can be compressed in gas compression means 205 and passed to one or more of the fixed compressed gas storage vessels 204 even during a period when no compressed gas is being dispensed to a receiving vessel 211.

Figure 2E:
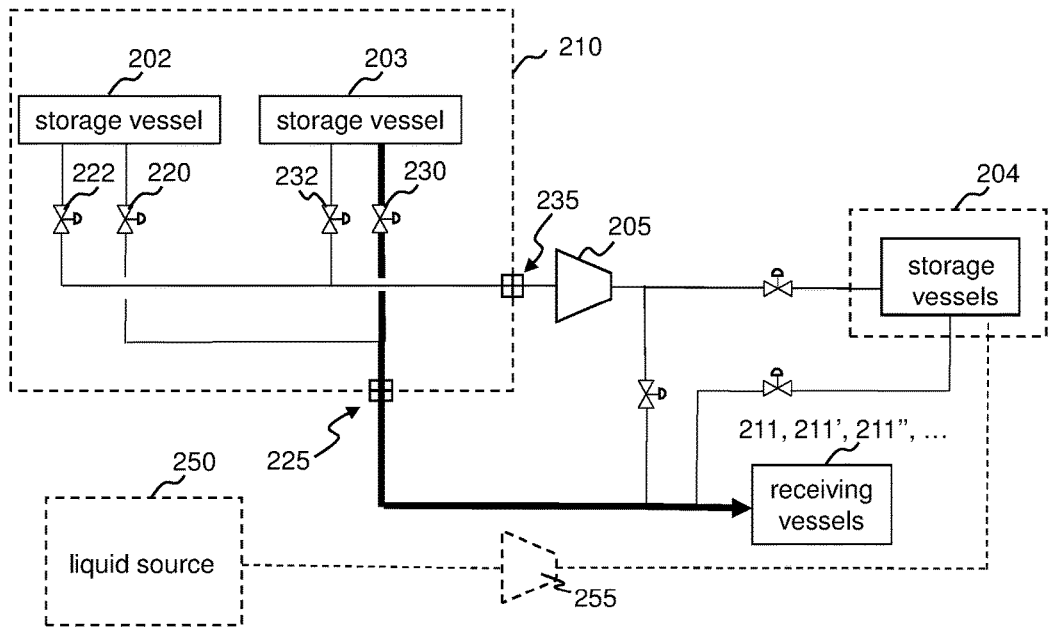

As per the cascade dispensing technique, compressed gas may be dispensed from a second storage vessel 203 of the plurality of storage vessels to the receiving vessel 211 as shown in FIG. 2e. The second storage vessel 203 at the beginning of dispensing to the receiving vessel 211 contains the compressed gas at a higher pressure than the first storage vessel 202 at the end of dispensing to the receiving vessel 211.

Compressed gas may be transferred from the second storage vessel 203 of the plurality of storage vessels using a pressure difference between the second storage vessel 203 and the receiving vessel 211. The transfer of the compressed gas may continue until the pressure difference between the two vessels is decreased to a desired amount.

The dispensing method may proceed with corresponding steps using other storage vessels of the plurality of storage vessels on the mobile compressed gas storage device 210. At no time during dispensing from one of the plurality of storage vessels of the mobile compressed gas storage device 210 is compressed gas simultaneously withdrawn from another of the plurality of storage vessels of the mobile compressed gas storage device 210 where the compressed gas from both of storage vessels is passed to the receiving tank 211. The compressor does not supply compressed gas to the receiving tank 211 from a gas source including any of the plurality of storage vessels of the mobile compressed gas storage device during any part of dispensing from another storage vessel of the mobile compressed gas storage device.

Figure 2F:
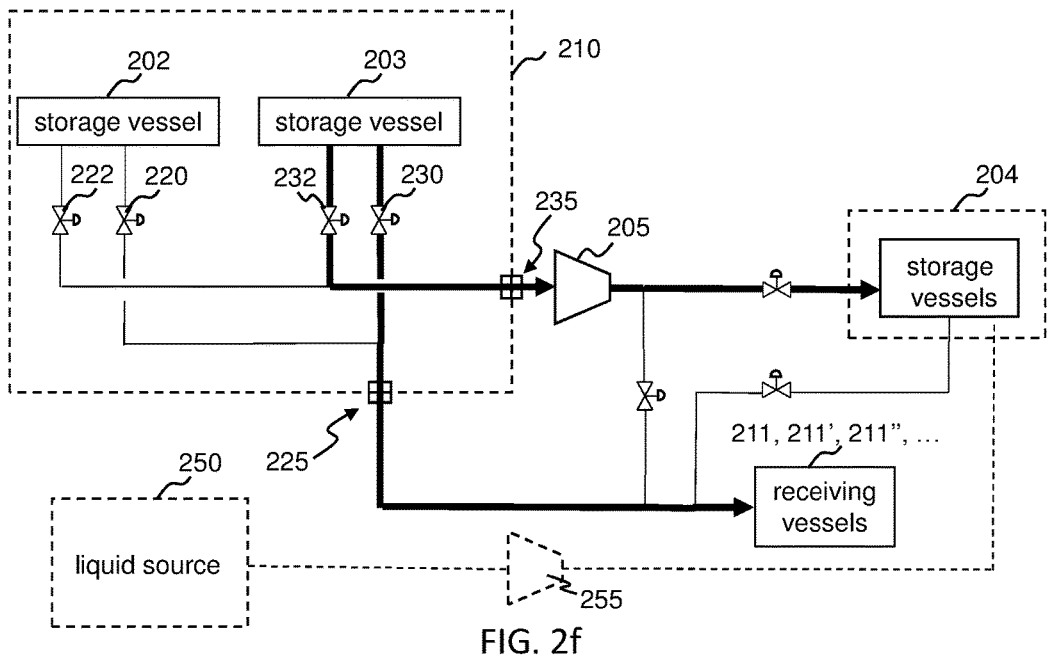

As shown in FIG. 2f, while compressed gas is being dispensed from the second storage vessel 203 of the plurality of storage vessels of the mobile compressed gas storage device 210, compressed gas from the second storage vessel 203 of the first compressed gas storage device may be fed to the gas compressing means 205 and the compressed gas from the gas compressing means 205 passed to one or more of the fixed storage vessels 204. Using compressed gas from the second storage vessel 203 having compressed gas at a high pressure facilitate the ability to maintain much higher pressure in at least one of the fixed storage vessels 204.

Figure 2G:
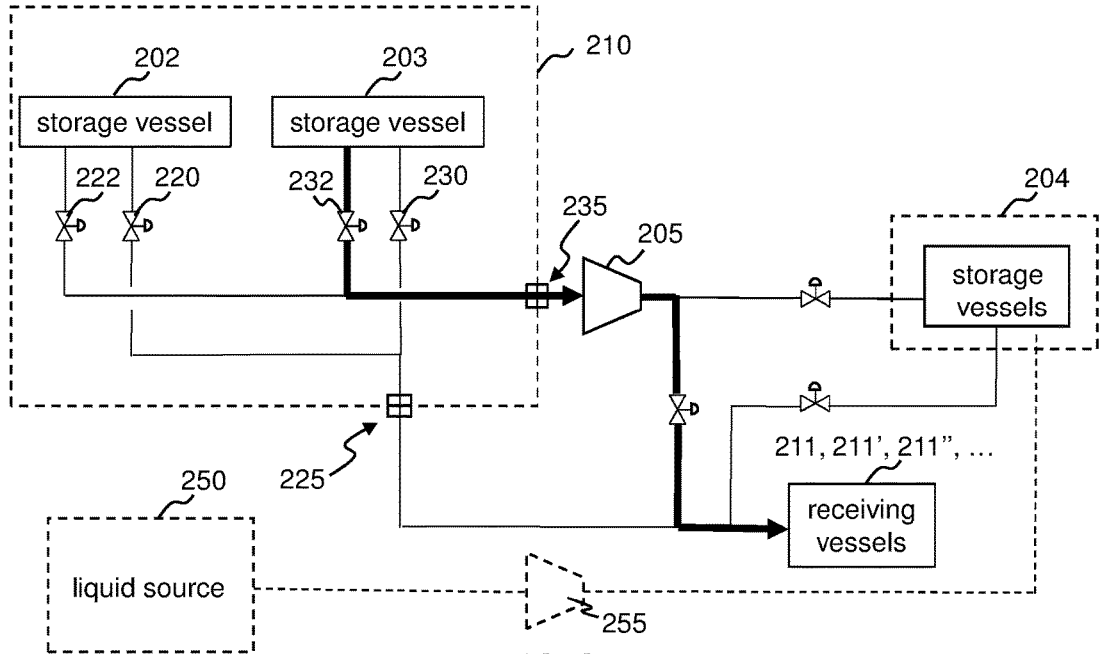

As shown in FIG. 2g, compressed gas from the second storage vessel 203 of the mobile compressed gas storage device may be compressed in the gas compressing means 205 and passed to the receiving vessel 211.

Figure 2H:
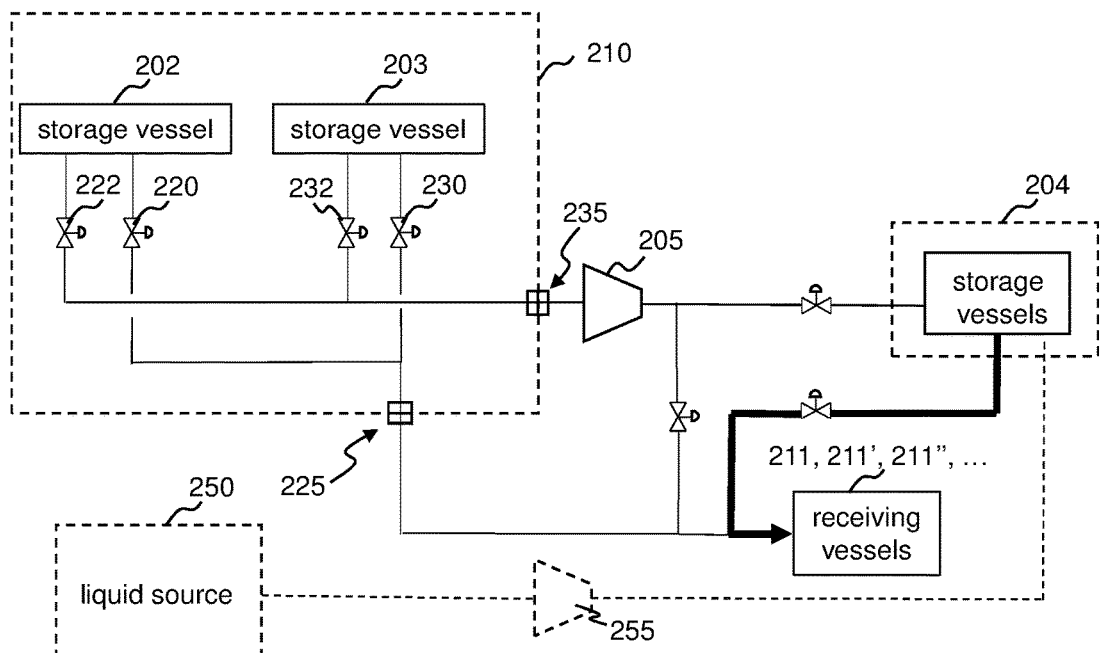

Cascade filling of the receiving vessel 211 may then continue with dispensing from one or more of the fixed storage vessels 204 as shown in FIG. 2h. One or more cascade filling steps may be performed depending on how many fixed storage vessels 204 there are.

Figure 2I:
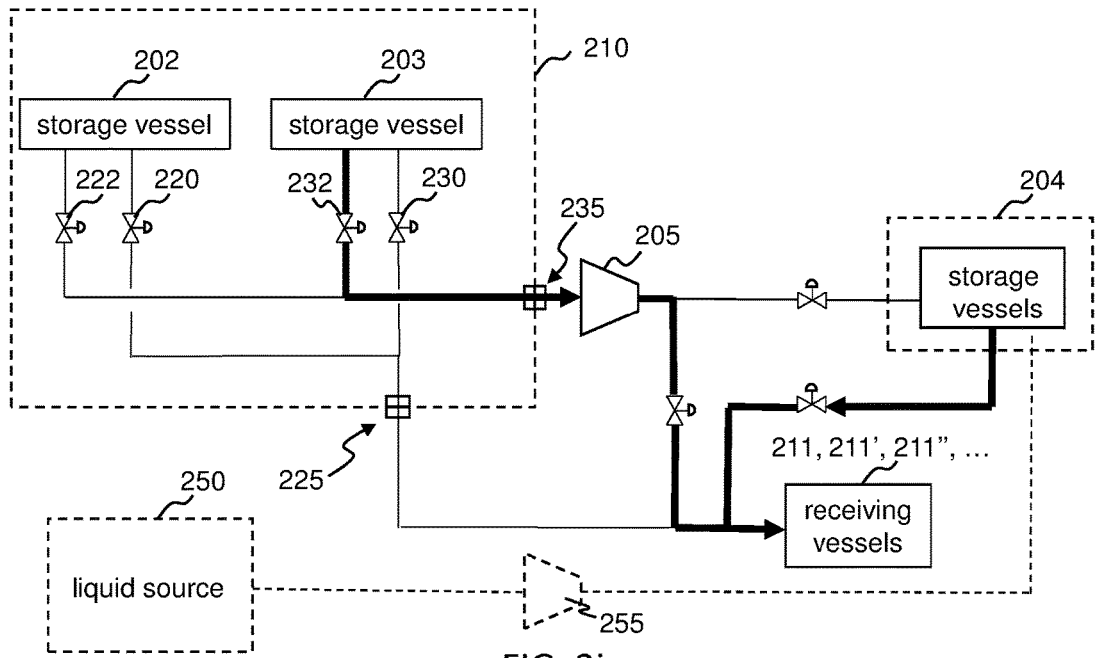

As shown in FIG. 2i, while compressed gas is being dispensed from one or more of the fixed storage vessels 204 to the receiving vessel 211, compressed gas may be simultaneously dispensed from the second storage vessel 203 of the mobile compressed gas storage device via the gas compressing means 205 to the receiving vessel 211.

At no time during this second method is compressed gas from the one or more fixed storage vessels 204 used as a source to the gas compressing means 205. This feature where compressed gas from the storage vessels is not used as a source by the gas compressing means 205 is a feature that characterizes the one or more fixed storage vessels 204 from the plurality of storage vessels 202, 203 on the mobile compressed gas storage device 210.

Figure 2J:
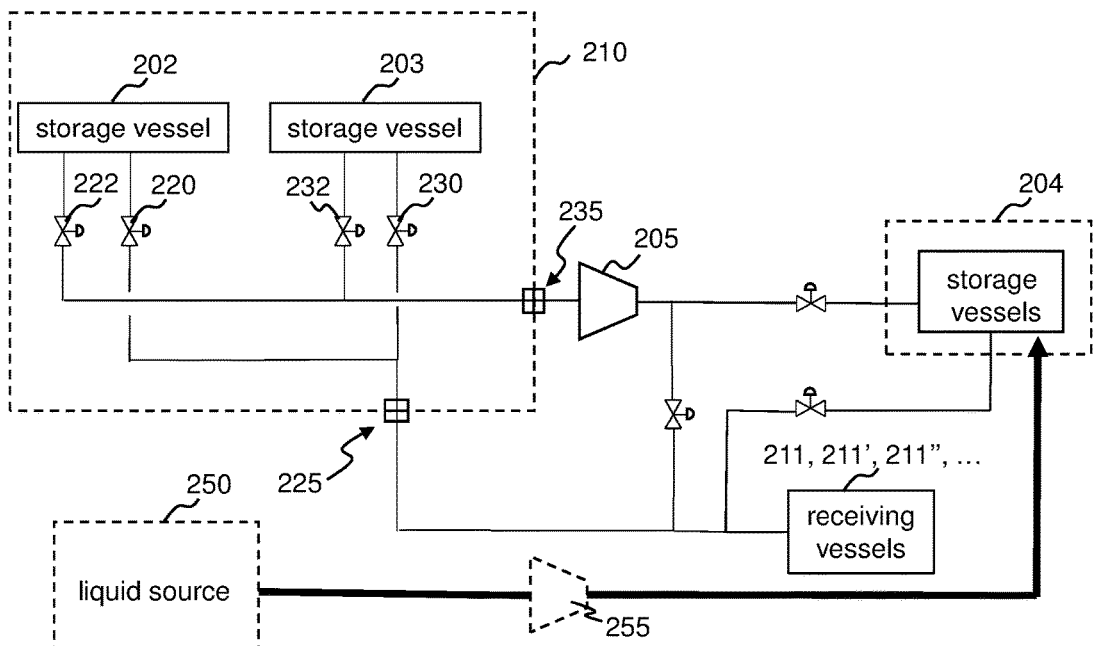

The dispensing method may include dispensing compressed gas sourced from the liquid storage vessel 250. The method may comprise transferring a first quantity of liquid from the liquid storage vessel 250 to the one or more fixed compressed gas storage vessels 204 via the compressor 205 or the fluid mover 110 as shown in FIG. 2j. The quantity of liquid forms a quantity of compressed gas at a pressure greater than 50 MPa or greater than 90 MPa in the one or more fixed compressed gas storage vessels 204.

The fluid mover 255 may advantageously cryogenically pump liquid since the pressure of the liquid is more efficiently increased than gas. Large molar quantities of compressed gas may be formed from pumping liquid with lower cost equipment and lower operating cost than gas. A heat exchanger (not shown) may be used to heat the pumped liquid by heat exchange with ambient air after passing through the fluid mover 255. Technically, the "liquid" leaving the fluid mover may be a supercritical fluid.

The first quantity of liquid may be transferred from the liquid storage vessel 250 to the one or more fixed storage vessels 204 via the fluid mover 205, where the fluid mover 255 receives the first quantity of liquid from the liquid storage vessel 250 in liquid form.

The fluid mover 255 may discharge a first quantity of effluent as a liquid or a supercritical fluid where the first quantity of effluent is formed from the first quantity of liquid. The first quantity of effluent from the fluid mover 255 may be heated to form the ninth quantity of gas.

Compressed gas from the one or more fixed compressed gas storage vessels 204 formed from the liquid may be dispensed to the receiving vessels as shown in FIG. 2h.

In a preferred embodiment of the second method, a first quantity of gas from a first storage vessel 202 of a plurality of storage vessels on a first mobile compressed gas storage device 210 is transferred to a receiving vessel 211 using a pressure difference between the gas in the first storage vessel 202 and the gas in the receiving vessel 211 to transfer the first quantity of gas. This may be accomplished according to one or more of the steps shown in FIGS. 2a, 2b, and 2c.

In the preferred embodiment of the second method, a second quantity of gas from a second storage vessel 203 of the plurality of storage vessels on the first mobile compressed gas storage device 210 is transferred to the receiving vessel 211 using a pressure difference between the gas in the second storage vessel 203 and the gas in the receiving vessel 211 to transfer the second quantity of gas. This may be accomplished according to one or more of the steps shown in FIGS. 2e, and 2f.

In the preferred embodiment of the second method, a third quantity of gas from at least one of the plurality of storage vessels on the first mobile compressed gas storage device 210 is transferred to one or more fixed storage vessels 204 via a compressor 205. This may be accomplished according to one or more of the steps shown in FIGS. 2b, 2c, 2d, and 2f.

In the preferred embodiment of the second method, a fourth quantity of the gas from at least one of the one or more fixed storage vessels 204 is transferred to the receiving vessel 211 using a pressure difference between the gas in the at least one of the one or more fixed storage vessels 204 and the gas in the receiving vessel 211 to transfer the fourth quantity of gas, wherein the fourth quantity of gas comprises at least a portion of the third quantity of gas. This may be accomplished according to one or more of the steps shown in FIG. 2h or 2i.

In the preferred embodiment of the second method, the first mobile compressed gas storage device is transported to a refilling station after the first mobile compressed gas storage device 210 has been depleted to a selected depletion level. The first mobile compressed gas storage device is refilled at the refilling station.

The first mobile compressed gas storage device is replaced at the dispensing station with a second mobile compressed gas storage device 210' as shown in FIG. 3.

In the preferred embodiment of the second method, a fifth quantity of the gas from a first storage vessel 202' of a plurality of storage vessels on the second mobile compressed gas storage device 210' is transferred to a second receiving vessel 211' using a pressure difference between the gas in the first storage vessel 202' of the plurality of storage vessels on the second mobile compressed gas storage device 210' and the gas in the second receiving vessel 211' to transfer the fifth quantity of gas. This may be accomplished according to one or more of the steps shown in FIGS. 2a, 2b, and 3c, where the second mobile compressed gas storage device 210' replaces the first mobile compressed gas storage device 210 in each of the respective figures and the second receiving vessel 211' replaces the first receiving vessel 211.

In the preferred embodiment of the second method, a sixth quantity of the gas from the second storage vessel 203' of the plurality of storage vessels on the second mobile compressed gas storage device 210' is transferred to the second receiving vessel 211' using a pressure difference between the gas in the second storage vessel 203' of the plurality of storage vessels on the second mobile compressed gas storage device 210' and the gas in the second receiving vessel 211' to transfer the sixth quantity of gas. This may be accomplished according to one or more of the steps shown in FIGS. 2e, and 2f, where the second mobile compressed gas storage device 210' replaces the first mobile compressed gas storage device 210 in each of the respective figures and the second receiving vessel 211' replaces the first receiving vessel 211.

In the preferred embodiment of the second method, a seventh quantity of the gas from at least one of the plurality of storage vessels 202', 203' on the second mobile compressed gas storage device 210' is transferred to one or more of the fixed storage vessels 204 via a compressor 205. This may be accomplished according to one or more of the steps shown in FIGS. 2b, 2c, 2d, and 2f, where the second mobile compressed gas storage device 210' replaces the first mobile compressed gas storage device 210 in each of the respective figures and the second receiving vessel 211' replaces the first receiving vessel 211.

In the preferred embodiment of the second method, an eighth quantity of the gas from the at least one or another of the one or more fixed storage vessels 204 is transferred to the second receiving vessel 211' using a pressure difference between the gas in the at least one or the other of the one or more fixed storage vessels 204 and the gas in the second receiving vessel 211' to transfer the eighth quantity of gas, wherein the eighth quantity of gas comprises at least a portion of the seventh quantity of gas. The at least one of the one or more fixed storage vessels providing the eighth quantity of gas may be the same or different as the at least one of the one or more fixed storage vessels providing the fourth quantity of gas. This may be accomplished according to one or more of the steps shown in FIGS. 2h, and 2i, where the second mobile compressed gas storage device 210' replaces the first mobile compressed gas storage device 210 in each of the respective figures and the second receiving vessel 211' replaces the first receiving vessel 211.

In a further embodiment of the second method, a first quantity of a liquid from the liquid storage vessel 250 may be transferred to the one or more fixed compressed gas storage vessels 204 via the compressor 205 or a fluid mover 255 thereby forming a ninth quantity of gas in the one or more fixed compressed gas storage vessels 204. This may be accomplished according to the step shown in FIG. 2j.

In the further embodiment of the second method, a tenth quantity of the gas from one or more of the plurality of storage vessels of the second mobile compressed gas storage device 210' may be transferred to a third receiving vessel 211" using a respective pressure difference between each of the one or more of the plurality of storage vessels on the second mobile compressed gas storage device and the gas in the third receiving vessel 211" to transfer the tenth quantity of gas. This may be accomplished according to one or more of the steps shown in FIGS. 2e, and 2f, where the second mobile compressed gas storage device 210' replaces the first mobile compressed gas storage device 210 in each of the respective figures and the third receiving vessel 211" replaces the first receiving vessel 211.

In the further embodiment of the second method, subsequent to the transfer of the tenth quantity of gas, an eleventh quantity of gas may be transferred from at least one of the one or more fixed compressed gas storage vessels 204 to the third receiving vessel 211" to transfer the eleventh quantity of gas, where the eleventh quantity of gas comprises at least a portion of the ninth quantity of gas (i.e. that formed from liquid). This may be accomplished according to one or more of the steps shown in FIGS. 2h, and 2i, where the second mobile compressed gas storage device 210' replaces the first mobile compressed gas storage device 210 in each of the respective figures and the third receiving vessel 211" replaces the first receiving vessel 211.

The third receiving vessel 211" may be charged to a target final pressure after receiving the eleventh quantity of gas from only the at least one of the one or more fixed compressed gas storage vessels 204 for a time when the pressure of the gas in each and every one of the storage vessels mounted on the second mobile compressed gas storage device 210' is determined to be insufficient to provide the target final pressure of gas in the third receiving vessel 211".

In yet a further embodiment of the second method, a twelfth quantity of gas may be transferred from the at least one or another of the one or more fixed compressed gas storage vessels 204 to a fourth receiving vessel 211''' using a pressure difference between the gas in the at least one or the other of the one or more fixed compressed gas storage vessels 204 and the gas in the fourth receiving vessel 211''' to transfer the twelfth quantity of gas. The gas is transferred to the fourth receiving vessel 211''' is provided from only the one or more fixed compressed gas storage vessels 204 to increase the pressure of the gas in the fourth receiving vessel 211''' from an initial pressure (i.e. at the time of connecting to the dispensing station) of the gas in the fourth receiving vessel to a target final pressure for the fourth receiving vessel. This may be accomplished according to one or more of the steps shown in FIGS. 2h, and 2i, where the second mobile compressed gas storage device 210' replaces the first mobile compressed gas storage device 210 in each of the respective figures and the fourth receiving vessel 211''' replaces the first receiving vessel 211.

Since no gas is transferred from the second mobile compressed gas storage device 210', the twelfth quantity of gas may be transferred from the one or more fixed compressed gas storage vessels 204 to the fourth receiving vessel 211''' when the storage vessels on the second mobile compressed gas storage device 210' each contain the gas at a pressure less than the initial pressure of the gas in the fourth receiving vessel 211'''.

In yet another further embodiment of the second method, a thirteenth quantity of gas may be transferred from the first storage vessels 202' of the plurality of storage vessels on the second mobile compressed gas storage device 210' to a fifth receiving vessel 211''' using a pressure difference between the gas in the first storage vessel 202' and the gas in the fifth receiving vessel 211''' to transfer the thirteenth quantity of gas. This may be accomplished according to one or more of the steps shown in FIGS. 2a, 2b, and 3c, where the second mobile compressed gas storage device 210' replaces the first mobile compressed gas storage device 210 in each of the respective figures and the fifth receiving vessel 211' replaces the first receiving vessel 211. Subsequent to the transfer of the thirteenth quantity of gas, a fourteenth quantity of gas may be transferred from the second storage vessel 203' of the plurality of storage vessels on the second mobile compressed gas storage device to the fifth receiving vessel 211''' using a pressure difference between the gas in the second storage vessel 203' and the gas in the fifth receiving vessel 211'''' to transfer the fourteenth quantity of gas. This may be accomplished according to one or more of the steps shown in FIGS. 2e, and 2f, where the second mobile compressed gas storage device 210' replaces the first mobile compressed gas storage device 210 in each of the respective figures and the second fifth vessel 211''' replaces the first receiving vessel 211. In this further embodiment, gas is provided to the fifth receiving vessel 211'''' from only the second mobile compressed gas storage device to increase the pressure of the gas in the fifth receiving vessel 211''' from an initial pressure (i.e. the pressure when the fifth receiving vessel is connected to the dispensing station) to a target final pressure for the fifth receiving vessel 211''''.

In the second method, a quantity of the gas from at least one of the plurality of storage vessels 202, 203 of the first mobile compressed gas storage device may be transferred to the receiving vessel 211 via a compressor as shown in FIGS. 2g and 2i. In the second method, the transfer of the quantity of gas from the at least one of the plurality of storage vessels 202, 203 of the first mobile compressed gas storage device 210 may be transferred to the receiving vessel 211 simultaneous with the transfer of the fourth quantity of gas from the at least one of the one or more fixed storage vessels to the receiving vessel 211.

A third method, with its various steps and optional steps, is described in FIGS. 4a-l. FIGS. 4a-l illustrate an exemplary process flow diagram for carrying out the method. The transfer lines and valves shown are only exemplary, and various alternative configurations could be used to carry out the method.

The third method is a method for dispensing compressed gas into a plurality of receiving vessels at a compressed gas dispensing station (10). The plurality of receiving vessels may be fuel tanks on-board various types of transportation vehicles. The compressed gas dispensing station 10 comprises a mobile compressed gas storage device 300, a liquid storage vessel 350, and one or more fixed compressed gas storage vessels 311. The liquid storage vessel 350 may be a fixed liquid storage vessel or a mobile liquid storage vessel.

The compressed gas dispensing station 10 is capable of having both compressed gas storage and liquid storage available. Dispensing of compressed gas sourced from the high pressure mobile compressed gas storage device 300 or sourced from the liquid storage vessel 350 can be decided based on economics and availability of the stored product in liquid or compressed gas form.

In case the liquid in the liquid storage vessel 350 is higher cost than the compressed gas in the mobile compressed gas storage device, the dispensing station 10 may preferentially dispense the compressed gas from the mobile compressed gas storage device 300. In case the compressed gas in the mobile compressed gas storage device 300 becomes depleted, the dispensing station 10 may dispense compressed gas sourced from the liquid storage vessel 350.

The liquid storage vessel 350 may be any suitable storage vessel for storing the desired product, for example, hydrogen. Storage vessels for storing liquid hydrogen are well-known. The liquid storage vessel 350 may be a fixed liquid storage vessel where liquid from a supply trailer is off-loaded to the fixed liquid storage vessel. The liquid storage vessel 350 may be mobile liquid storage vessel mounted on a trailer where the mobile liquid storage vessel itself is transported back and forth between a supply depot and the dispensing station 10.

The mobile compressed gas storage device 300 comprises a plurality of storage vessels 302, 303. While only two are shown, the plurality of storage vessels 302, 303 may include any desired number of high pressure storage vessels. The pressure of compressed gas contained within each of the plurality of storage vessels 302, 303 can be the same as one another or different from one another. The high pressure storage vessels 302, 303 may have a maximum pressure rating of, for example, 50 MPa or 90 MPa. The mobile compressed gas storage device 300 is mobile, meaning that the mobile compressed gas storage device 300 may be filled at a compressed gas supply depot, brought to the compressed gas dispensing station 10, used as a source of compressed gas at the compressed gas dispensing station 10, and after the compressed gas is depleted to a selected depletion level, returned again to the compressed gas supply depot to be recharged with compressed gas. The use of storage vessels with high pressure compressed gas onboard a mobile compressed gas storage device provides the benefit of reducing the reliance on a gas compressor at the dispensing station and reducing the associated power requirements of the gas compressor at the dispensing station.

The mobile compressed gas storage device 300 may be designed and configured to be readily swapped out with another mobile compressed gas storage device as described above. The mobile compressed gas storage device 300 and dispensing station 10 may be configured to minimize the number of high pressure connections between the mobile compressed gas storage device 300 and the dispensing station 10 as discussed above.

The dispensing station 10 may be operated using more than one mobile compressed gas storage device 300 at a time and when cascade dispensing to a receiving vessel, may withdraw from more than one mobile compressed gas storage device when dispensing to the receiving vessel as described in U.S. Pat. No. 8,453,682.

The mobile compressed gas storage device 300 arrives at the compressed gas dispensing station 10 charged with compressed gas.

The one or more fixed compressed gas storage vessels 311 may include any desired number of high pressure storage vessels. The pressure of compressed gas contained within each of the one or more fixed storage vessels 311 can be the same as one another or different from one another. The one or more fixed compressed gas storage vessels may have a maximum pressure rating of, for example 50 MPa or 90 MPa.

The compressed gas dispensing station 10 also comprises a fluid mover 310, which can be a pump or compressor. The fluid mover may be capable of pumping liquid, gas, and two-phase mixtures of liquid and gas from the liquid source to the one or more fixed compressed gas storage vessels 311. U.S. Pat. No. 5,243,821 discloses a suitable fluid mover.

A suitable cryogenic hydrogen compressor system is available commercially from Air Products and Chemicals, Inc. (cf. http://www.airproducts.com/microsite/2013_hydrogen_support/33969_cryogenic_hydrogen_compressor_ds.pdf). Various models (CHC-3000, CHC-3000, CHC-6000, CHC-7000 and CHC-30000) are available depending on the required flow and pressure ratings.

The method comprises operatively connecting a first receiving vessel 371 of the plurality of receiving vessels to the compressed gas station 10. Suitable nozzles and receivers for connecting receiving vessels and compressed gas stations are well-known in the hydrogen dispensing art. When the first receiving vessel 371 is operatively connected to the compressed gas dispensing station 10, the first receiving vessel 371 contains compressed gas at an initial pressure.

Figure 4A:
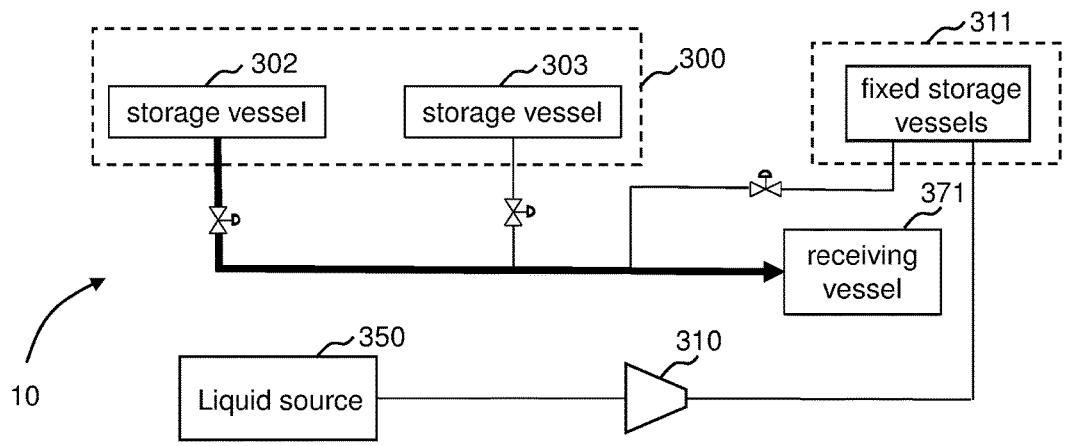
FIGS. 4a-l illustrate steps available for a fourth compressed gas dispensing method.

As shown in FIG. 4*a*, the method comprises transferring a first quantity of compressed gas from a first storage vessel 302 of the plurality of storage vessels on the mobile compressed gas storage device 300 to the first receiving vessel 371 of the plurality of receiving vessels. The first quantity of compressed gas is transferred using a pressure difference between the compressed gas in the first storage vessel 302 and the compressed gas in the first receiving vessel 371 to transfer the first quantity of compressed gas without the use of a compressor. The transfer of the compressed gas may continue until the pressure difference between the two vessels is decreased to a desired amount.

Figure 4B:
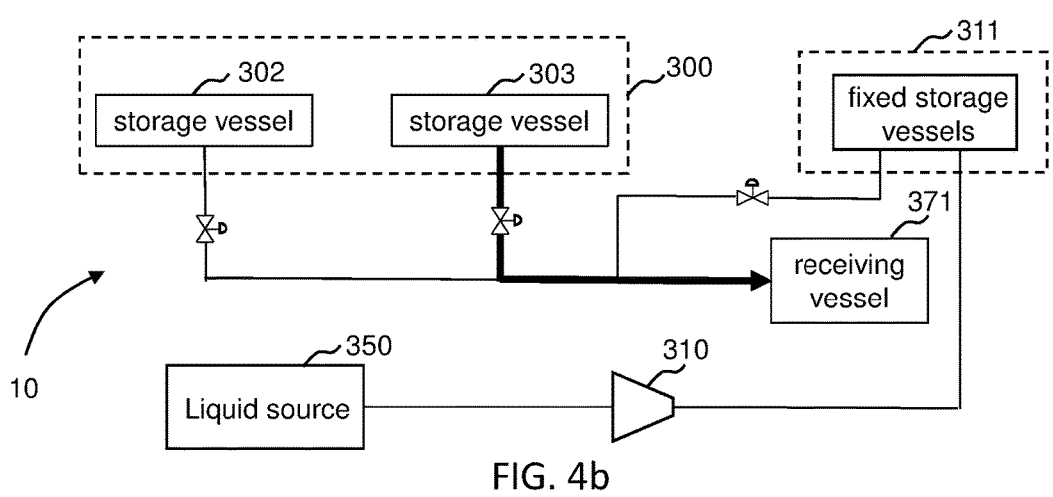

As per the cascade dispensing technique, as shown in FIG. 4*b*, subsequent to the transfer of the first quantity of compressed gas, the method comprises transferring a second quantity of compressed gas from a second storage vessel 303 of the plurality of storage vessels on the mobile compressed gas storage device 300 to the first receiving vessel 371. The second storage vessel 303 at the beginning of dispensing to the first receiving vessel 371, contains compressed gas at a higher pressure than the first storage vessel 302 at the end of dispensing to the first receiving vessel 371. The second quantity of compressed gas is transferred using a pressure difference between the compressed gas in the second storage vessel 303 and the compressed gas in the first receiving vessel 371 to transfer the second quantity of compressed gas without the use of a compressor. The transfer of the compressed gas may continue until the pressure difference between the two vessels is decreased to a desired amount.

The dispensing method may proceed by dispensing additional compressed gas from the mobile compressed gas storage device to the first receiving vessel 371 with corresponding steps using other storage vessels of the plurality of storage vessels on the mobile compressed gas storage device 300. Dispensing using the cascade filling technique may use any number of the plurality of storage vessels of the mobile compressed gas storage device 300. Compressed gas is transferred to the first receiving vessel 371 from only the mobile compressed gas storage device 300 to increase the pressure of the compressed gas in the first receiving vessel 371 from the initial pressure to a target pressure for the first receiving vessel 371; the first receiving vessel 371 is refilled to a target pressure using only compressed gas from the mobile compressed gas storage device 300. The first receiving vessel 371 may then be disconnected from the compressed gas dispensing station 10.

As used herein, "target pressure" and "target final pressure" denotes a maximum pressure to which the respective receiving vessel is charged at the dispensing station. Refilling is terminated and the respective receiving vessel disconnected from the dispensing station when the gas in the respective receiving vessel has reached the target pressure for the respective receiving vessel. Since the pressure of the gas exiting the dispensing nozzle of the dispensing station, which is operatively connected to the respective receiving vessel, is roughly the same as the pressure of the gas in the receiving vessel, it can be equivalently stated that the gas is dispensed until the gas exiting the dispensing nozzle of the dispensing station is at the target pressure for the respective receiving vessel.

Figure 4C:
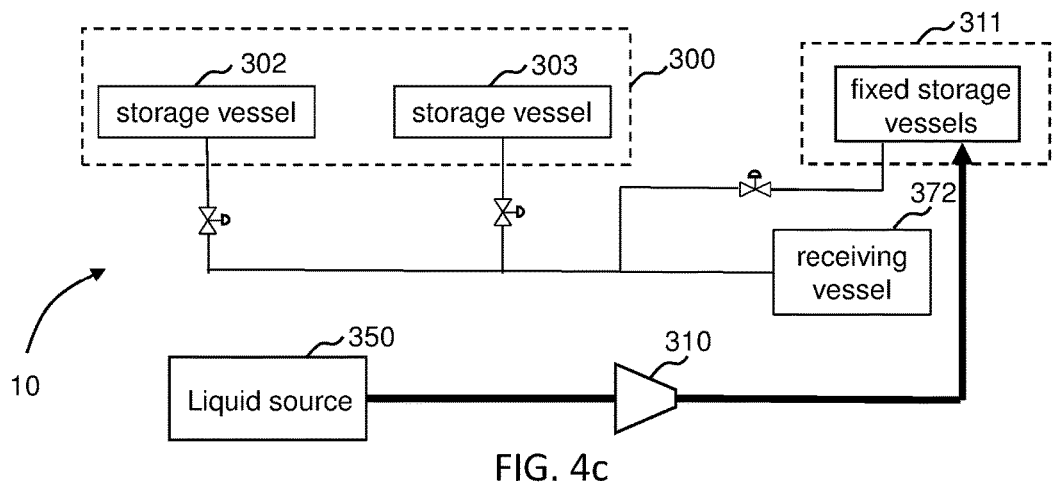

The dispensing method includes dispensing compressed gas sourced from the liquid storage vessel 350. The method comprises transferring a first quantity of liquid from the liquid storage vessel 350 to the one or more fixed compressed gas storage vessels 311 via the fluid mover 110 as shown in FIG. 4c. The first quantity of liquid forms a third quantity of compressed gas at a pressure greater than 50 MPa or greater than 90 MPa in the one or more fixed compressed gas storage vessels 311.

The fluid mover 110 may advantageously cryogenically pump liquid since the pressure of the liquid is more efficiently increased than gas. Large molar quantities of compressed gas may be formed from pumping liquid with lower cost equipment and lower operating cost than gas. A heat exchanger (not shown) may be used to heat the pumped liquid by heat exchange with ambient air after passing through the fluid mover 110. Technically, the "liquid" leaving the fluid mover may be a supercritical fluid.

The method comprises operatively connecting a second receiving vessel 372 of the plurality of receiving vessels to the compressed gas dispensing station 10.

Figure 4D:
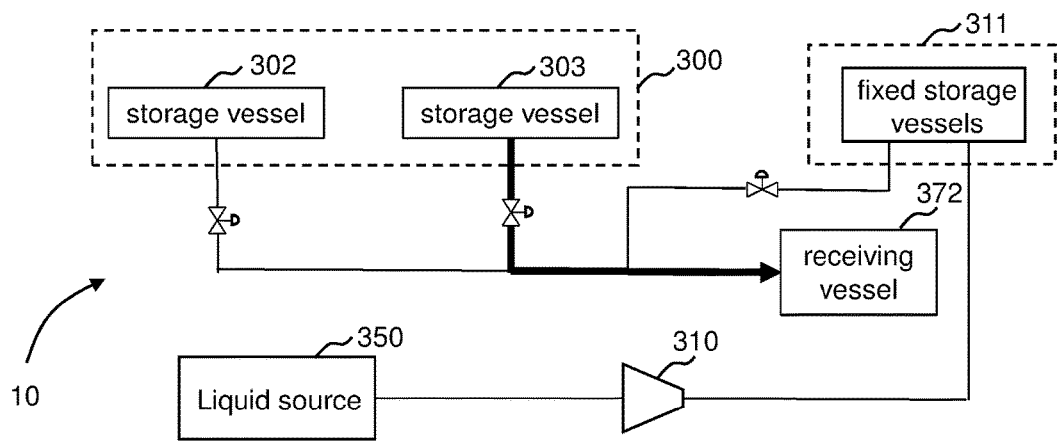

The method comprises transferring a fourth quantity of compressed gas from one or more of the plurality of storage vessels 302, 303 on the mobile compressed gas storage device 300 to the second receiving vessel 372 of the plurality of receiving vessels. FIG. 4d shows the fourth quantity of compressed gas being transferred from the second storage vessel 303 to the second receiving vessel 372. The fourth quantity of compressed gas is transferred using a respective pressure difference between the compressed gas in the one or more of the plurality of storage vessels 302, 303 and the compressed gas in the second receiving vessel 372 to transfer the fourth quantity of compressed gas without the use of a compressor. The transfer of the compressed gas may continue until the pressure difference between the two vessels is decreased to a desired amount. The one or more of the plurality of storage vessels 302, 303 may include one or more of the first storage vessel of the plurality of storage vessels, the second storage vessel of the plurality of storage vessels, and a third storage vessel of the plurality of storage vessels.

Figure 4E:
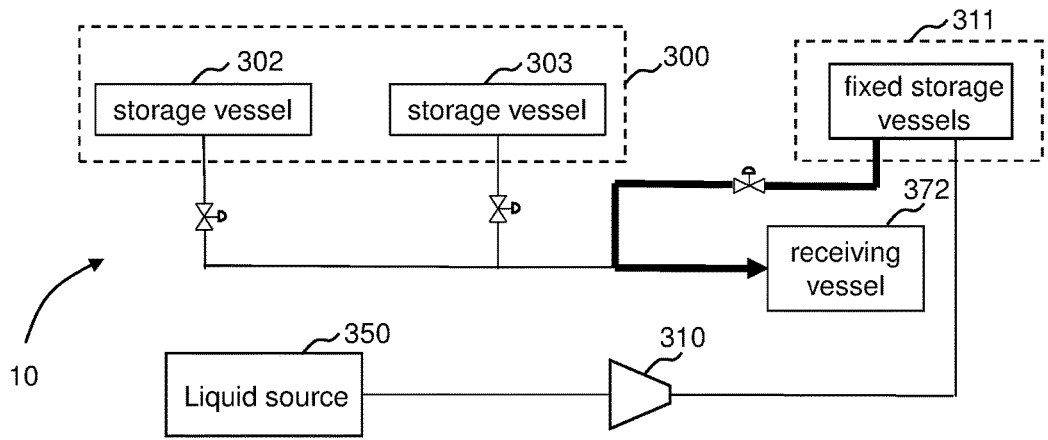

As per the cascade dispensing technique, as shown in FIG. 4e, subsequent to the transfer of the fourth quantity of compressed gas, the method comprises transferring a fifth quantity of compressed gas from at least one of the one or more fixed compressed gas storage vessels 311 to the second receiving vessel 372. The fifth quantity of compressed gas may be transferred when the pressure of the compressed gas in each and every one of the total number of storage vessels mounted on the mobile compressed gas storage device 300 is determined to be insufficient to provide a target pressure of compressed gas in the second receiving vessel 372.

The fifth quantity of compressed gas may be dispensed from more than one of the one or more fixed compressed gas storage vessels 311 using the cascade filling technique. The fifth quantity of compressed gas comprises at least a portion of the third quantity of compressed gas; the fifth quantity of compressed gas is formed from liquid from the liquid storage vessel 350. The at least one of the one or more fixed compressed gas storage vessels 311 at the beginning of dispensing to the second receiving vessel 372, contains compressed gas at a higher pressure than the one or more of the plurality of storage vessels on the mobile compressed gas storage device 300 at the end of dispensing to the second receiving vessel 372. The fifth quantity of compressed gas is transferred using a respective pressure difference between the compressed gas in the at least one of the one or more fixed compressed gas storage vessels 311 and the compressed gas in the second receiving vessel 372 to transfer the fifth quantity of compressed gas without the use of a compressor. The transfer of the compressed gas may continue until the pressure difference between the two vessels is decreased to a desired amount.

The dispensing method may proceed by dispensing additional compressed gas from additional storage vessels of the one or more fixed compressed gas storage vessels 311 to the second receiving vessel 372 with corresponding steps using other storage vessels of the one or more fixed compressed gas storage vessels 311.

Compressed gas is transferred to the second receiving vessel 372 from the mobile compressed gas storage device 300 and the one or more fixed compressed gas storage vessels to increase the pressure of the compressed gas in the second receiving vessel 372; the second receiving vessel 372 is refilled to a target pressure using compressed gas from the mobile compressed gas storage device 300 and at least one of the one or more fixed compressed gas storage vessels 311 where the at least one of the one or more fixed compressed gas storage vessels are filled from the liquid storage vessel 350. After refilling the second receiving vessel 372 to a target pressure, the second receiving vessel 372 may be disconnected from the compressed gas dispensing station 10.

Providing high pressure compressed gas from the fixed compressed gas storage vessels 311 provides the advantage of allowing lower pressure compressed gas to be dispensed from the mobile compressed gas storage device 300 to further deplete the compressed gas from the mobile compressed gas storage device 300 while still being able to provide compressed gas up to the desired target pressure to the receiving vessels. More compressed gas can be taken from the mobile compressed gas storage device 300 before the mobile compressed gas storage device 300 needs to be transported to the compressed gas supply depot to be recharged with compressed gas.

The method comprises operatively connecting a third receiving vessel 373 of the plurality of receiving vessels to the compressed gas dispensing station 10. When the third receiving vessel 373 is operatively connected to the compressed gas dispensing station 10, the third receiving vessel 373 contains compressed gas at an initial pressure.

Figure 4F:
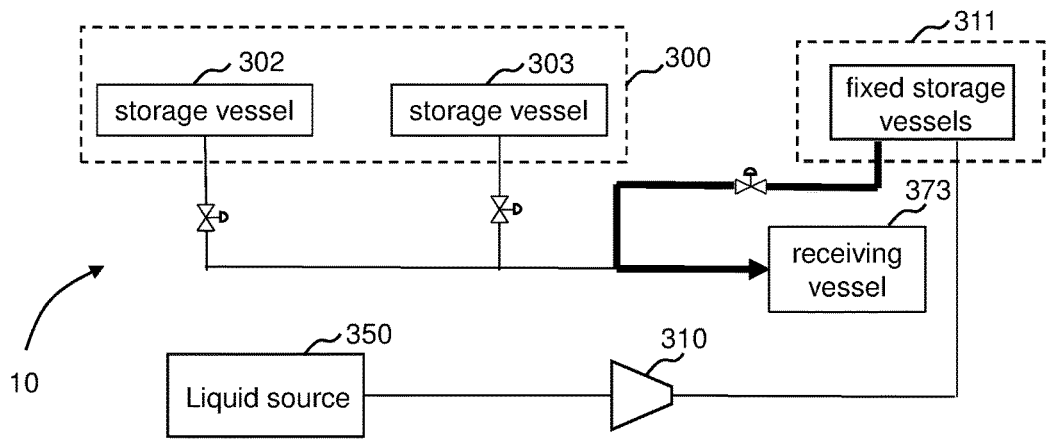

The method comprises transferring a sixth quantity of the compressed gas from the at least one or another of the one or more fixed compressed gas storage vessels 311 to the third receiving vessel 373 of the plurality of receiving vessels. The sixth quantity of compressed gas may be dispensed from more than one of the one or more fixed compressed gas storage vessels 311 using the cascade filling technique. FIG. 4f shows the sixth quantity of compressed gas being transferred from the one or more fixed compressed gas storage vessels 311 to the third receiving vessel 373. The sixth quantity of compressed gas is transferred using a respective pressure difference between the compressed gas in the at least one or the other of the one or more fixed compressed gas storage vessels 311 and the compressed gas in the third receiving vessel 373 to transfer the sixth quantity of compressed gas without the use of a compressor. The transfer of the compressed gas may continue until the pressure difference between the two vessels is decreased to a desired amount.

Compressed gas is transferred to the third receiving vessel 373 from only the one or more fixed compressed gas storage vessels 311 to increase the pressure of the compressed gas in the third receiving vessel 373 from the initial pressure of the compressed gas in the third receiving vessel 373 to a target pressure for the third receiving vessel 373; the third receiving vessel 373 is refilled from the initial pressure to the target pressure using only compressed gas from the one or more fixed compressed gas storage vessels 311.

The sixth quantity of compressed gas may be transferred from the one or more fixed compressed gas storage vessels 311 to the third receiving vessel 373 when the storage vessels on the mobile compressed gas storage device 300 contain the compressed gas at a pressure less than the initial pressure of compressed gas in the third receiving vessel 373 or when there are no mobile compressed gas storage devices connected to the compressed gas dispensing station 10.

After refilling the third receiving vessel 373 to a target pressure, the third receiving vessel 373 may be disconnected from the compressed gas dispensing station 10.

The ability to dispense compressed gas solely from the one or more fixed compressed gas storage vessels 311 where the one or more fixed compressed gas storage vessels are filled from the liquid storage vessel 350 provides a backup supply of high pressure compressed gas in case the storage vessels on the mobile compressed gas storage device 300 become depleted or when there are no mobile compressed gas storage devices operatively connected to the compressed gas dispensing station 10.

The liquid supply may optionally provide cooling of the compressed gas dispensed from the mobile compressed gas storage device 300, through the use of a heat exchanger, if desired. The heat exchanger may exchange heat between the liquid or cold gas from the liquid storage vessel 350 and the compressed gas from the mobile compressed gas storage device with or without the use of cooling blocks as, for example, described in EP2682664A2 and U.S. Pat. No. 8,671,997B2.

The compressed gas dispensing station 10 may continue to dispense to receiving vessels until the compressed gas is depleted in the mobile compressed gas storage device 300 and the pressure of compressed gas is deemed insufficient to refuel further receiving vessels.

After the mobile compressed gas storage device 300 is depleted to a selected depletion level, the mobile compressed gas storage device may then be disconnected from the compressed gas dispensing station 10 and a second mobile compressed gas storage device 400 may be operatively connected to the compressed gas dispensing station 10. The selected depletion level may be selected depending on the cost of compressed gas provided on the mobile compressed gas storage devices and the cost of liquid for forming the compressed gas, and/or on the availability of product in the various forms, etc. The second mobile compressed gas storage device 400 comprises a plurality of storage vessels 402, 403.

The method may further comprise operatively connecting a fourth receiving vessel 374 of the plurality of receiving vessels to the compressed gas dispensing station 10. When the fourth receiving vessel is operatively connected to the compressed gas dispensing station 10, the fourth receiving vessel 374 contains compressed gas at an initial pressure.

Figure 4G:
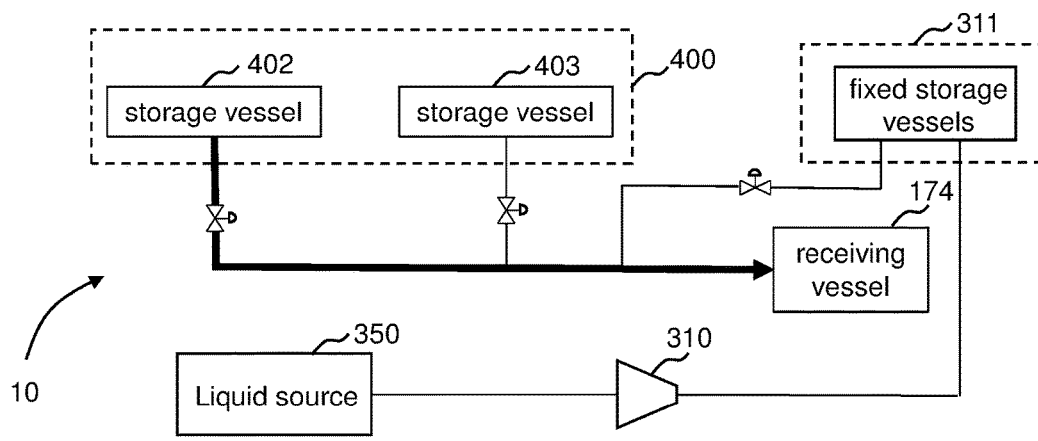

As shown in FIG. 4g, the method may further comprise transferring a seventh quantity of compressed gas from the first storage vessel 402 of the plurality of storage vessels on the second mobile compressed gas storage device 400 to the fourth receiving vessel 374 of the plurality of receiving vessels. The seventh quantity of compressed gas may be transferred using a pressure difference between the compressed gas in the first storage vessel 402 and the compressed gas in the fourth receiving vessel 374 to transfer the seventh quantity of compressed gas without the use of a compressor. The transfer of the compressed gas may continue until the pressure difference between the two vessels is decreased to a desired amount.

Figure 4H:
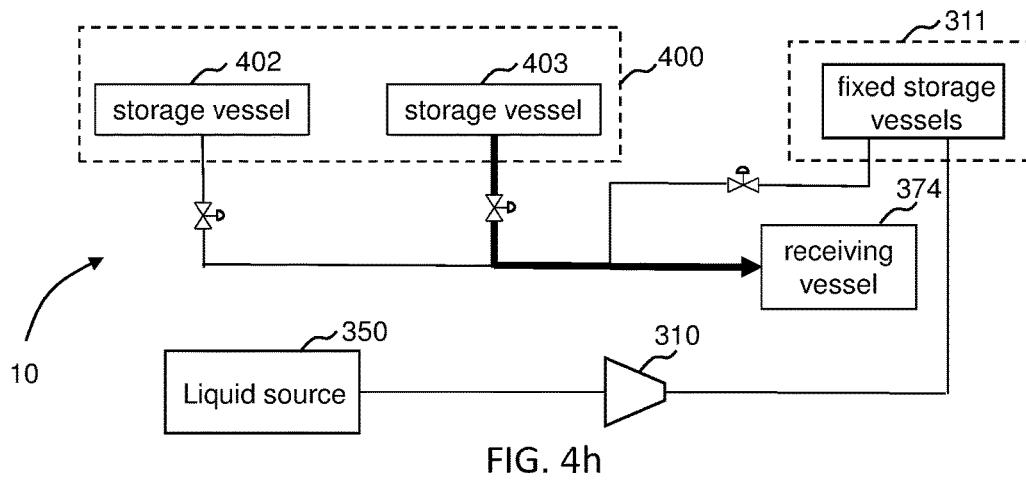

As per the cascade dispensing technique, as shown in FIG. 4h, subsequent to the transfer of the seventh quantity of compressed gas, the method may comprise transferring an eighth quantity of compressed gas from a second storage vessel 403 of the plurality of storage vessels on the second mobile compressed gas storage device 400 to the fourth receiving vessel 374. The second storage vessel 403 at the beginning of dispensing to the fourth receiving vessel 374, contains compressed gas at a higher pressure than the first storage vessel 402 at the end of dispensing to the fourth receiving vessel 374. The eighth quantity of compressed gas is transferred using a pressure difference between the compressed gas in the second storage vessel 403 and the compressed gas in the fourth receiving vessel 374 to transfer the eighth quantity of compressed gas without the use of a compressor. The transfer of the compressed gas may continue until the pressure difference between the two vessels is decreased to a desired amount.

The dispensing method may proceed by dispensing additional compressed gas from the second mobile compressed gas storage device 400 to the fourth receiving vessel 374 with corresponding steps using other storage vessels of the plurality of storage vessels on the second mobile compressed gas storage device 400. Dispensing using the cascade filling technique may use any number of the plurality of storage vessels of the second mobile compressed gas storage device 400. Compressed gas is transferred to the fourth receiving vessel 374 from only the second mobile compressed gas storage device 400 to increase the pressure of the compressed gas in the fourth receiving vessel 374 from the initial pressure to a target pressure for the fourth receiving vessel 374; the fourth receiving vessel 374 is refilled to a target pressure using only compressed gas from the second mobile compressed gas storage device 400.

Upon disconnecting the mobile compressed gas storage device 300 from the dispensing station 10, the mobile compressed gas storage device 300 may be transported to a compressed gas supply depot. The mobile compressed gas storage device 300 may be recharged with compressed gas at the compressed gas supply depot and the mobile compressed gas storage device 300 transported back to the dispensing station 10.

The mobile compressed gas storage device 300 may be operatively connected to the compressed gas dispensing station 10 and used again to dispense compressed gas to receiving vessels.

The method may comprise operatively connecting a fifth receiving vessel 375 to the compressed gas dispensing station 10. When the fifth receiving vessel is operatively connected to the compressed gas dispensing station 10, the fifth receiving vessel 375 contains compressed gas at an initial pressure.

Figure 4I:
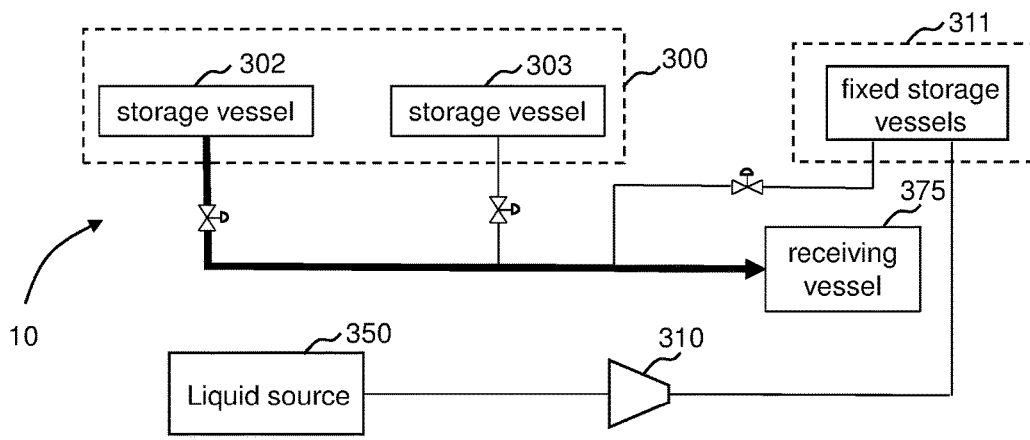

As shown in FIG. 4i, the method may further comprise transferring a ninth quantity of compressed gas from the first storage vessel 302 of the plurality of storage vessels on the mobile compressed gas storage device 300 to the fifth receiving vessel 375 of the plurality of receiving vessels. The ninth quantity of compressed gas may be transferred using a pressure difference between the compressed gas in the first storage vessel 302 and the compressed gas in the fifth receiving vessel 375 to transfer the ninth quantity of compressed gas without the use of a compressor. The transfer of the compressed gas may continue until the pressure difference between the two vessels is decreased to a desired amount.

Figure 4J:
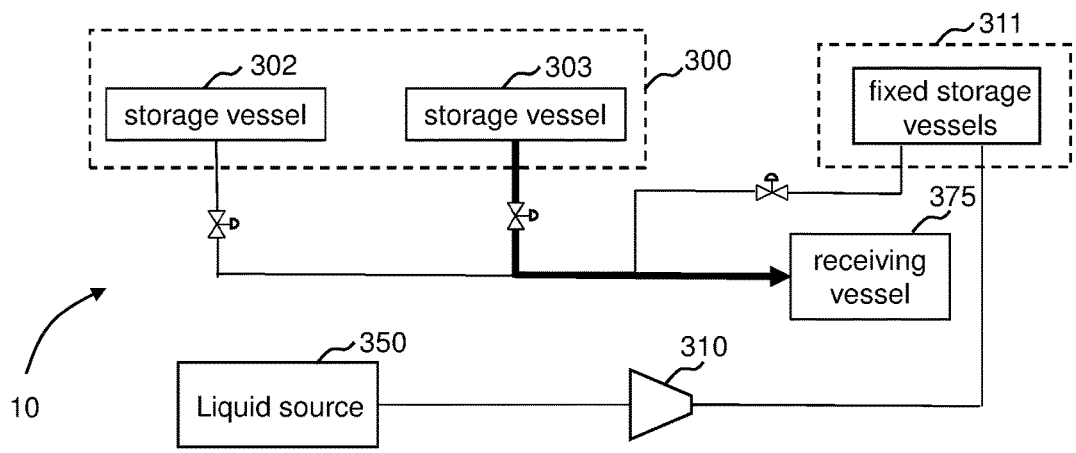

As per the cascade dispensing technique, as shown in FIG. 4*j*, subsequent to the transfer of the ninth quantity of compressed gas, the method may comprise transferring a tenth quantity of compressed gas from a second storage vessel 303 of the plurality of storage vessels on the mobile compressed gas storage device 300 to the fifth receiving vessel 375. The second storage vessel 303 at the beginning of dispensing to the fifth receiving vessel 375, contains compressed gas at a higher pressure than the first storage vessel 302 at the end of dispensing to the fifth receiving vessel 375. The tenth quantity of compressed gas is transferred using a pressure difference between the compressed gas in the second storage vessel 303 and the compressed gas in the fifth receiving vessel 375 to transfer the tenth quantity of compressed gas without the use of a compressor. The transfer of the compressed gas may continue until the pressure difference between the two vessels is decreased to a desired amount.

The dispensing method may proceed by dispensing additional compressed gas from the mobile compressed gas storage device 300 to the fifth receiving vessel 375 with corresponding steps using other storage vessels of the plurality of storage vessels on the mobile compressed gas storage device 300. Compressed gas is transferred to the fifth receiving vessel 375 from only the mobile compressed gas storage device 300 to increase the pressure of the compressed gas in the fifth receiving vessel 375 from the initial pressure to a target pressure for the fifth receiving vessel 375; the fifth receiving vessel 375 is refilled to a target pressure using only compressed gas from the mobile compressed gas storage device 300.

Figure 4K:
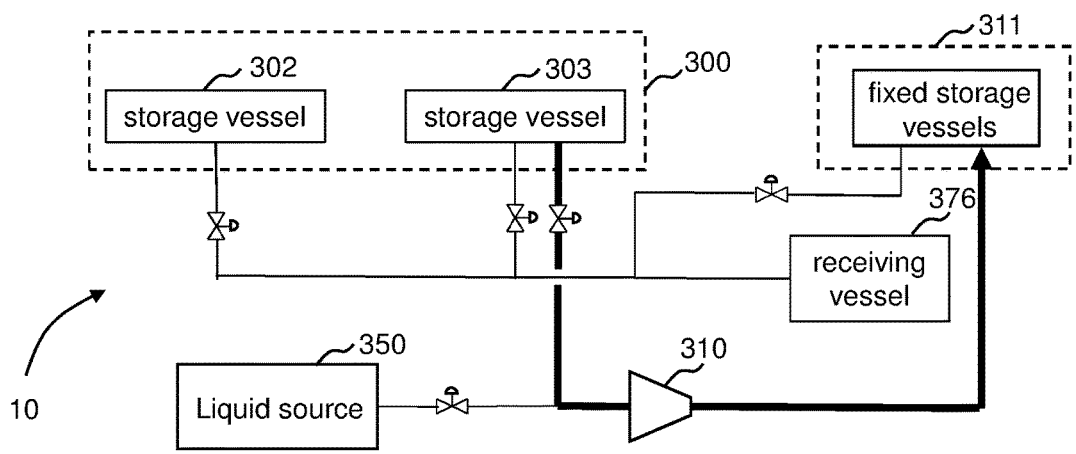

As shown in FIG. 4*k*, the method may comprise transferring a quantity of compressed gas from one or more of the of the plurality of storage vessels 302, 303 on the mobile compressed gas storage device 300 to one or more of the fixed compressed gas storage vessels 311 via the fluid mover (110). This could be done when the pressure in the plurality of storage vessels 302, 303 is deemed insufficient to supply the compressed gas to a receiving vessel to a desired target pressure.

Figure 4L:
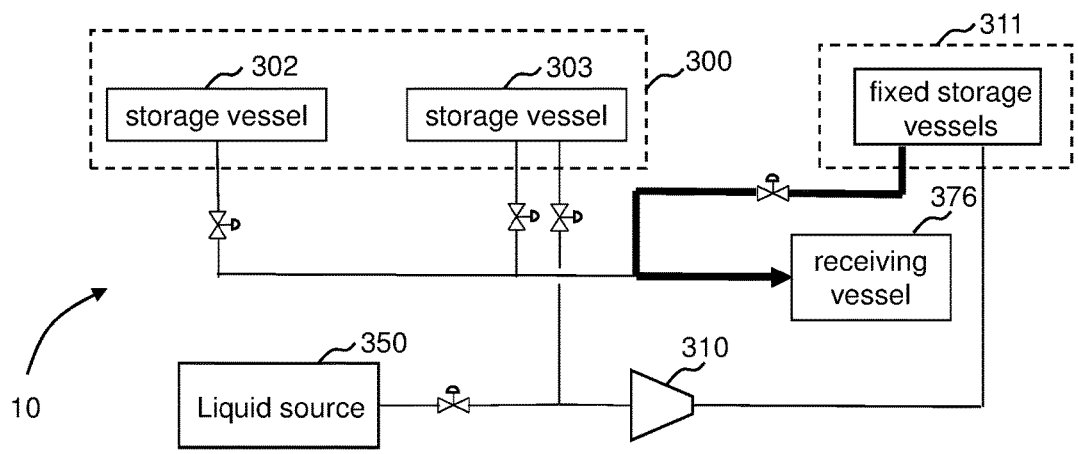

Another receiving vessel 376 may be operatively connected to the dispensing station 10. As shown in FIG. 4*l*, the method may comprise transferring a quantity of compressed gas from one or more of the fixed compressed gas storage vessels 311 to the other receiving vessel 376 using the pressure difference between the compressed gas in the one or more fixed compressed gas storage vessels 311 and the compressed gas in the other receiving vessel 376 to transfer the quantity of compressed gas. The quantity of compressed gas transferred from the one or more of the fixed compressed gas storage vessels 311 to the other receiving vessel 376 comprises at least a portion of the quantity of compressed gas transferred from the one or more of the plurality of storage vessels 302, 303 on the mobile compressed gas storage device 300 to the one or more of the fixed compressed gas storage vessels 311 via the fluid mover 110.

These method steps where compressed gas is transferred from one or more of the plurality of storage vessels 302, 303 on the mobile compressed gas storage device 300 to one or more of the fixed compressed gas storage vessels 311 via the fluid mover and compressed gas subsequently transferred from the one or more fixed compressed gas storage vessels 311 to another receiving tank provides the benefit of improving the utilization of the compressed gas in the plurality of storage vessels 302, 303 prior to the mobile compressed gas storage device 300 needing to be transported to a compressed gas supply depot to be recharged with compressed gas; the plurality of storage vessels on the mobile compressed gas storage device 300 may be depleted more completely before being recharged. This configuration has a synergistic effect in that it has the benefit of not requiring an additional fluid mover to accomplish the transfer of the compressed gas from the mobile compressed gas storage device 300 to the one or more fixed compressed gas storage vessels 311.

For each of these methods, the skilled person can select suitable steps and omit steps as desired.

The invention claimed is:

1. A method for dispensing a gas to a plurality of receiving vessels, the method comprising:
   transferring a first quantity of the gas from a first storage vessel of a plurality of storage vessels on a first mobile compressed gas storage device to a receiving vessel using a pressure difference between the gas in the first storage vessel and the gas in the receiving vessel to transfer the first quantity of gas;
   transferring a second quantity of the gas from a second storage vessel of the plurality of storage vessels on the first mobile compressed gas storage device to the receiving vessel using a pressure difference between the gas in the second storage vessel and the gas in the receiving vessel to transfer the second quantity of gas;
   transferring a third quantity of the gas from at least one of the plurality of storage vessels on the first mobile compressed gas storage device to one or more fixed compressed gas storage vessels via a compressor;
   transferring a fourth quantity of the gas from at least one of the one or more fixed compressed gas storage vessels to the receiving vessel using a pressure difference between the gas in the at least one of the one or more fixed compressed gas storage vessels and the gas in the receiving vessel to transfer the fourth quantity of gas, wherein the fourth quantity of gas comprises at least a portion of the third quantity of gas;
   transporting the first mobile compressed gas storage device to a refilling station after the first mobile compressed gas storage device has been depleted to a selected depletion level;
   refilling the first mobile compressed gas storage device at the refilling station;
   transferring a fifth quantity of the gas from a first storage vessel of a plurality of storage vessels on a second mobile compressed gas storage device to a second receiving vessel using a pressure difference between the gas in the first storage vessel of the plurality of storage vessels on the second mobile compressed gas storage device and the gas in the second receiving vessel to transfer the fifth quantity of gas;
   transferring a sixth quantity of the gas from a second storage vessel of the plurality of storage vessels on the second mobile compressed gas storage device to the second receiving vessel using a pressure difference between the gas in the second storage vessel of the plurality of storage vessels on the second mobile compressed gas storage device and the gas in the second receiving vessel to transfer the sixth quantity of gas;
   transferring a seventh quantity of the gas from at least one of the plurality of storage vessels on the second mobile compressed gas storage device to one or more of the fixed storage vessels via a compressor;
   transferring an eighth quantity of the gas from the at least one or another of the one or more fixed compressed gas storage vessels to the second receiving vessel using a pressure difference between the gas in the at least one or the other of the one or more fixed compressed gas storage vessels and the gas in the second receiving vessel to transfer the eighth quantity of gas, wherein the eighth quantity of gas comprises at least a portion of the seventh quantity of gas transferring a first quantity of a liquid from a liquid storage vessel to the one or more fixed compressed gas storage vessels via the compressor or a fluid mover thereby forming a ninth quantity of the gas in the one or more fixed compressed gas storage vessels;

transferring a tenth quantity of the gas from one or more of the plurality of storage vessels on the second mobile compressed gas storage device to a third receiving vessel using a respective pressure difference between each of the one or more of the plurality of storage vessels on the second mobile compressed gas storage device and the gas in the third receiving vessel to transfer the tenth quantity of gas; and subsequent to the transfer of the tenth quantity of gas, transferring an eleventh quantity of gas from at least one of the one or more fixed compressed gas storage vessels to the third receiving vessel using a pressure difference between the gas in the at least one of the one or more fixed compressed gas storage vessels and the gas in the third receiving vessel to transfer the eleventh quantity of gas, wherein the eleventh quantity of gas comprises at least a portion of the ninth quantity of gas.

2. The method according to claim 1 further comprising:

transferring a twelfth quantity of gas from the at least one or another of the one or more fixed compressed gas storage vessels to a fourth receiving vessel using a pressure difference between the gas in the at least one or the other of the one or more fixed compressed gas storage vessels and the gas in the fourth receiving vessel to transfer the twelfth quantity of gas;

wherein the gas is transferred to the fourth receiving vessel from only the one or more fixed compressed gas storage vessels to increase the pressure of the gas in the fourth receiving vessel from an initial pressure of the gas in the fourth receiving vessel to a target final pressure for the fourth receiving vessel.

3. The method of claim 2 wherein the twelfth quantity of gas is transferred from the one or more fixed compressed gas storage vessels to the fourth receiving vessel when the storage vessels on the second mobile compressed gas storage device each contain the gas at a pressure less than the initial pressure of the gas in the fourth receiving vessel.

4. The method of claim 1 wherein the third receiving vessel contains the gas at a target final pressure after receiving the eleventh quantity of gas;

wherein the second mobile compressed gas storage device has a total number of storage vessels mounted on the second mobile compressed gas storage device; and wherein the eleventh quantity of the gas is transferred from the at least one of the one or more fixed compressed gas storage vessels to the third receiving vessel when the pressure of the gas in each and every one of the total number of storage vessels mounted on the second mobile compressed gas storage device is determined to be insufficient to provide the target final pressure of gas in the third receiving vessel.

5. The method of claim 1 further comprising:

transferring a thirteenth quantity of gas from the first storage vessel of the plurality of storage vessels on the second mobile compressed gas storage device to a fifth receiving vessel using a pressure difference between the gas in the first storage vessel and the gas in the fifth receiving vessel to transfer the thirteenth quantity of gas;

subsequent to the transfer of the thirteenth quantity of gas, transferring a fourteenth quantity of the gas from the second storage vessel of the plurality of storage vessels on the second mobile compressed gas storage device to the fifth receiving vessel using a pressure difference between the gas in the second storage vessel and the gas in the fifth receiving vessel to transfer the fourteenth quantity of gas;

wherein the gas is transferred to the fifth receiving vessel from only the second mobile compressed gas storage device to increase the pressure of the compressed gas in the fifth receiving vessel from an initial starting pressure to a target final pressure for the fifth receiving vessel.

6. The method of claim 1 wherein the liquid storage vessel is a fixed liquid storage vessel.

7. The method of claim 1 wherein the liquid storage vessel is a mobile liquid storage vessel.

8. The method of claim 1 wherein the first quantity of liquid is transferred from a liquid storage vessel to the one or more fixed compressed gas storage vessels via the fluid mover, and wherein the fluid mover receives the first quantity of liquid from the liquid storage vessel in liquid form.

9. The method of claim 8 wherein the fluid mover discharges a first quantity of effluent as a liquid or a supercritical fluid, the first quantity of effluent formed from the first quantity of liquid, the method further comprising heating the first quantity of effluent from the fluid mover to form the ninth quantity of the gas.

10. The method of claim 1 further comprising transferring a quantity of the gas from at least one of the plurality of storage vessels of the plurality of storage vessels on the first mobile compressed gas storage device to the receiving vessel via the compressor.

11. The method of claim 10 wherein the transfer of the quantity of the gas from the at least one of the storage vessels of the plurality of storage vessels on the first mobile compressed gas storage device to the receiving vessel via the compressor is simultaneous with the transfer of the fourth quantity of gas from the at least one of the one or more fixed compressed gas storage vessels to the receiving vessel.

* * * * *